(12) United States Patent
Severson et al.

(10) Patent No.: US 12,373,616 B2
(45) Date of Patent: Jul. 29, 2025

(54) THERMAL MODELING OF ADDITIVE MANUFACTURING USING GRAPH THEORY

(71) Applicant: NUtech Ventures, Lincoln, NE (US)

(72) Inventors: Jordan Severson, Lincoln, NE (US); Prahalada Rao, Lincoln, NE (US); Reza Yavari, Lincoln, NE (US); Kevin D. Cole, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 942 days.

(21) Appl. No.: 17/499,402

(22) Filed: Oct. 12, 2021

(65) Prior Publication Data

US 2022/0114307 A1    Apr. 14, 2022

Related U.S. Application Data

(60) Provisional application No. 63/090,617, filed on Oct. 12, 2020.

(51) Int. Cl.
*G06F 30/12* (2020.01)
*G06F 30/13* (2020.01)
*G06F 30/20* (2020.01)

(52) U.S. Cl.
CPC .................. *G06F 30/20* (2020.01)

(58) Field of Classification Search
CPC .... G06F 18/241; G06F 30/27; G06F 18/2415; G06F 3/0482; G06F 3/0604; G06F 3/062; G06F 3/067; G06F 30/20; G06F 40/216; G06F 40/295; G06F 40/30
See application file for complete search history.

(56) References Cited

U.S. PATENT DOCUMENTS

| 10,409,933 B2* | 9/2019 | Komzisk ................. G06T 17/10 |
| 10,525,630 B2* | 1/2020 | Nguyen .................. B22F 10/25 |
| 2004/0249809 A1 | 12/2004 | Ramani et al. |

(Continued)

FOREIGN PATENT DOCUMENTS

| WO | WO 2014/074954 | 5/2014 |
| WO | WO 2016/133679 | 8/2016 |
| WO | WO 2020056388 | 3/2020 |

OTHER PUBLICATIONS

[No Author Listed], "ASTM ISO/ASTM52910-17 Standard Guidelines for Design for Additive Manufacturing," ASTM International, 2016, West Conshohocken, PA, 14 pages.

(Continued)

*Primary Examiner* — Rehana Perveen
*Assistant Examiner* — John David Hagler
(74) *Attorney, Agent, or Firm* — Fish & Richardson P.C.

(57) ABSTRACT

Methods, systems, and apparatus, including computer programs encoded on a computer storage medium, for an additive manufacturing heat transfer simulation. For example, an additive manufacturing heat transfer simulation system converts a model of an object into a node representation of the object, and generates a network graph of the object based on the node representation. For each block of nodes in the node representation the system applies a simulated heat to the block of nodes, estimates a diffusion of heat to other nodes based on the network graph, and estimates a heat loss to atmosphere. The system generates a representation of an estimated heat distribution within the object.

20 Claims, 22 Drawing Sheets
(13 of 22 Drawing Sheet(s) Filed in Color)

(56) References Cited

U.S. PATENT DOCUMENTS

| | | | |
|---|---|---|---|
| 2011/0074936 A1 | 3/2011 | Gavrilenco | |
| 2012/0206605 A1 | 8/2012 | Buehler et al. | |
| 2016/0321384 A1* | 11/2016 | Pal | B33Y 50/02 |
| 2017/0337307 A1* | 11/2017 | Oancea | B22F 10/20 |
| 2022/0058315 A1 | 2/2022 | Yavari et al. | |
| 2022/0284154 A1 | 9/2022 | Yavari et al. | |

OTHER PUBLICATIONS

Cole et al., "Computational heat transfer with spectral graph theory: Quantitative verification," International Journal of Thermal Sciences, Jul. 2020, 153:106383, 15 pages.

Denlinger et al., "Effect of inter-layer dwell time on distortion and residual stress in additive manufacturing of titanium and nickel alloys," Journal of Materials Processing Technology, 2015, 215:123-131.

Denlinger et al., "Thermomechanical model development and in situ experimental validation of the Laser Powder-Bed Fusion process," Additive Manufacturing, Accepted Manuscript, 2017, 16:73-80, 29 pages.

Denlinger et al., "Thermomechanical modeling of additive manufacturing large parts," J. Manuf. Sci. Eng., 2014, 136(6):061007-1-061007-8.

Dunbar et al., "Comparisons of laser powder bed fusion additive manufacturing builds through experimental in situ distortion and temperature measurements," Additive Manufacturing, Accepted Manuscript, 2017, 15:57-65, 21 pages.

Escolano et al., "Heat diffusion: Thermodynamic depth complexity of networks," Physical Review E, 2012, 85(3):036206, 15 pages.

Francois et al., "Modeling of additive manufacturing processes for metals: Challenges and opportunities," Current Opinion in Solid State and Materials Science, 2017, 21(4):198-206.

Ganeriwala et al., "Multiphysics modeling and simulation of selective laser sintering manufacturing processes," Procedia CIRP, 2014, 14:299-304.

Goldak et al., "A New Finite Element Model for Welding Heat Sources," Metallurgical Transactions B, 1984, 15:299-305.

Goldak et al., "Computer Simulation of Welding Processes," Computational Welding Mechanics, 2005, 16-69.

Gouge et al., "Modeling forced convection in the thermal simulation of laser cladding processes," The International Journal of Advanced Manufacturing Technology, Feb. 4, 2015, 79:307-320.

Heigel et al., "Thermomechanical model development and validation of directed energy deposition additive manufacturing of Ti—6A1—4V," Additive Manufacturing, Jan. 2015, 5:9-19, 46 pages.

Heigel, "Thermo-Mechanical Model Development and Experimental Validation for Directed Energy Deposition Additive Manufacturing Processes," Thesis for the degree of Doctor of Philosophy, Pennsylvania State University, Mechanical Engineering, May 2015, 216 pages.

Khairallah et al., "Laser powder-bed fusion additive manufacturing: physics of complex melt flow and formation mechanisms of pores, spatter, and denudation zones," Acta Materialia, 2016, 108:36-45.

King et al., "Laser powder bed fusion additive manufacturing of metals; physics, computational, and materials challenges," Appl. Phys. Rev., 2015, 2(4):041304, 27 pages.

King et al., "Overview of modelling and simulation of metal powder-bed fusion process at Lawrence Livermore National Laboratory," Materials Science and Technology, 2014, 31(8):957-968.

Lee et al., "Mesoscopic simulation of heat transfer and fluid flow in laser powder bed additive manufacturing." International Solid Free Form Fabrication Symposium, 2015, 1154-1165.

Martukanitz et al., "Toward an integrated computational system for describing the additive manufacturing process for metallic materials," Additive Manufacturing, 2014, 1:52-63.

Michaleris, "Modeling metal deposition in heat transfer analyses of additive manufacturing processes," Finite Elements in Analysis and Design, 2014, 86:51-60.

Oterkus et al., "Peridynamic thermal diffusion," Journal of Computational Physics, 2014, 265:71-96.

PCT International Preliminary Report on Patentability in International Appln. No. PCT/US2019/051192, dated Mar. 25, 2021, 10 pages.

PCT International Search Report and Written Opinion in International Appln. No. PCT/US2019/051192, dated Nov. 25, 2019, 12 pages.

Raghavan et al., "Numerical modeling of heat-transfer and the influence of process parameters on tailoring the grain morphology of IN718 in electron beam additive manufacturing," Acta Materialia, 2016, 112:303-314.

Romer "Matlab Laser Toolbox User Manual," University of Twente, Enschede, Netherlands, Sep. 23, 2010, 19 pages.

Romer "Matlab Laser Toolbox," Physics Procedia, Dec. 2010, 5:413-419.

Rosen, "Computer-aided design for additive manufacturing of cellular structures," Computer-Aided Design and Applications, 2007, 4(5):585-594.

Rosen, "Design for additive manufacturing: Past, present, and future directions," Journal of Mechanical Design, 2014, 136(9):090301, 2 pages.

Schoinochoritis et al., "Simulation of metallic powder bed additive manufacturing processes with the finite element method: A critical review," Proc IMechE Part B: J Engineering Manufacture, 2015, 231(1):96-117.

Silling et al., "A meshfree method based on the peridynamic model of solid mechanics," Computers and Structures, 2005, 83:1526-1535.

Sun et al., "Spectral Collocation Method for Transient Conduction-Radiation Heat Transfer," Journal of Thermophysics and Heat Transfer, 2010, 24(4):823-832.

Wang et al., "Topological design and additive manufacturing of porous metals for bone scaffolds and orthopaedic implants: a review," Biomaterials, 2016, 83:127-141.

Xiao et al., "Graph characteristics from the heat kernel trace," Pattern Recognition, 2009, 42(11):2589-2606.

Yan et al., "Review on thermal analysis in laser-based additive manufacturing," Optics & Laser Technology, Oct. 2018, 106:427-441.

Yang et al., "Design for Additive Manufacturing," Additive Manufacturing of Metals: The Technology, Materials, Design and Production, 2017, Springer, pp. 81-160.

Yavari et al., "Design Rules for Additive Manufacturing—Understanding the Fundamental Thermal Phenomena to Reduce Scrap," Procedia Manufacturing, 2019, 33:375-382.

Yavari et al., "Predicting Part-Level Thermal History in Metal Additive Manufacturing Using Graph Theory: Experimental Validation With Directed Energy Deposition of Titanium Alloy Parts," Presented at ASME 2019 14th International Manufacturing Science and Engineering Conference, Erie, PA, USA, Jun. 10-14, 2019, 7 pages.

Yavari et al., "Thermal Modeling in Metal Additive Manufacturing using Graph Theory," Journal of Manufacturing Science and Engineering, Jul. 2019, 141(7):071007, 20 pages.

Ye et al., "Numerical Modeling of Metal-Based Additive Manufacturing Using Level Set Methods," Journal of Manufacturing Science and Engineering, 2017, 139(7):071019-1-071019-8.

Zhang et al., "Graph spectral image smoothing using the heat kernel," Pattern Recognition, 2008, 41(11):3328-3342.

\* cited by examiner

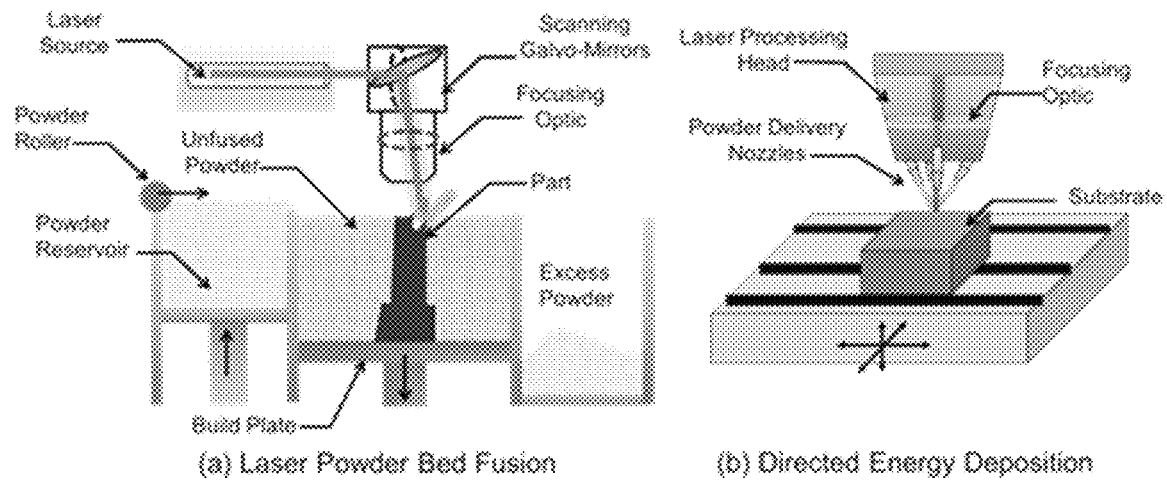
FIG. 1A      FIG. 1B
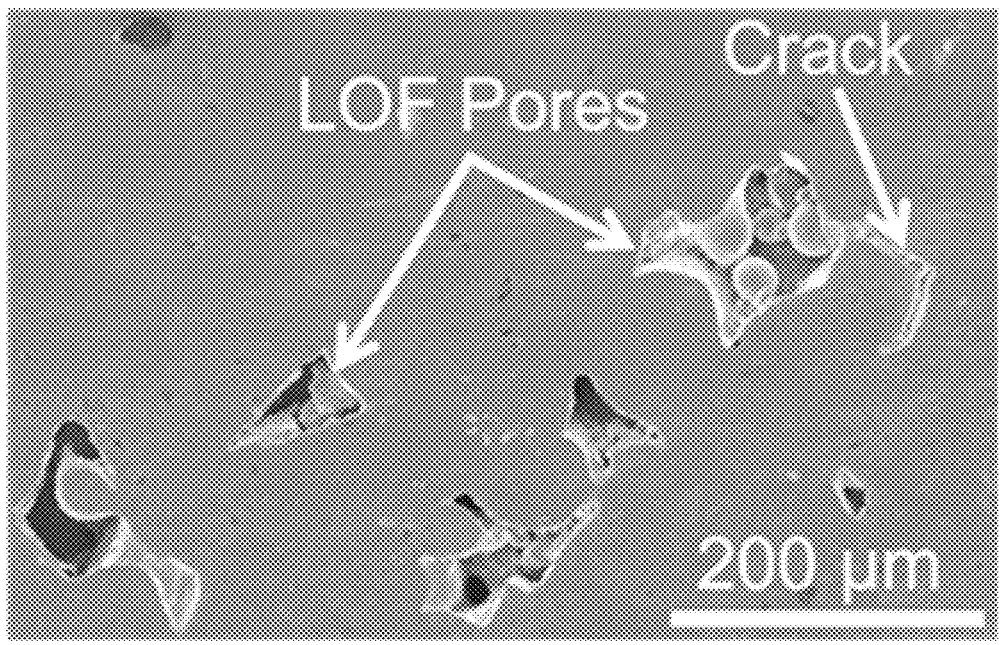
FIG. 2

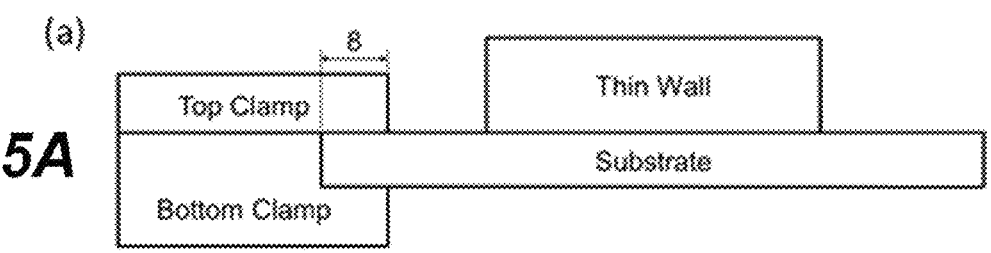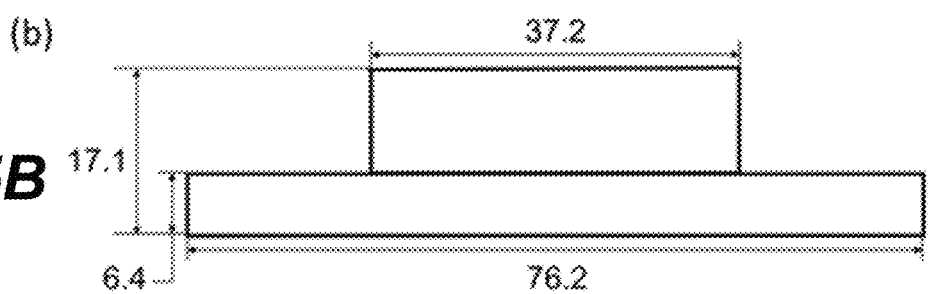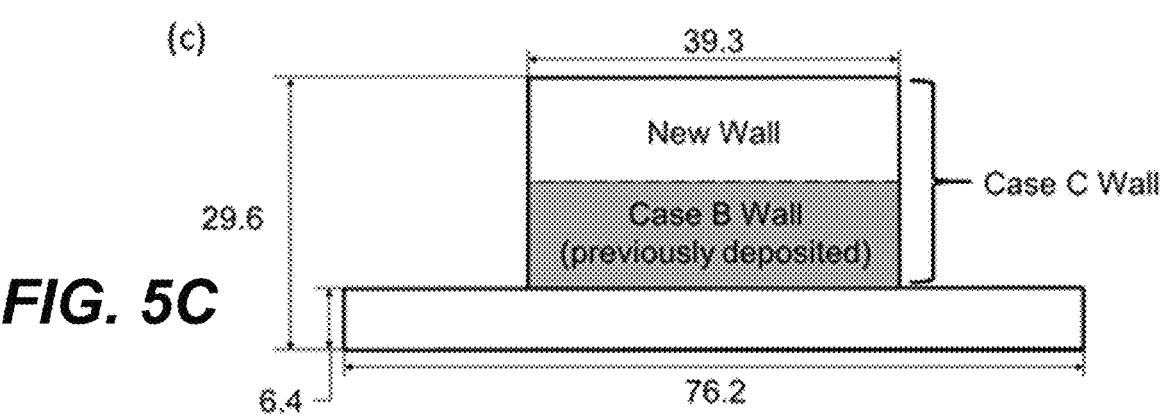
FIG. 5A
FIG. 5B
FIG. 5C

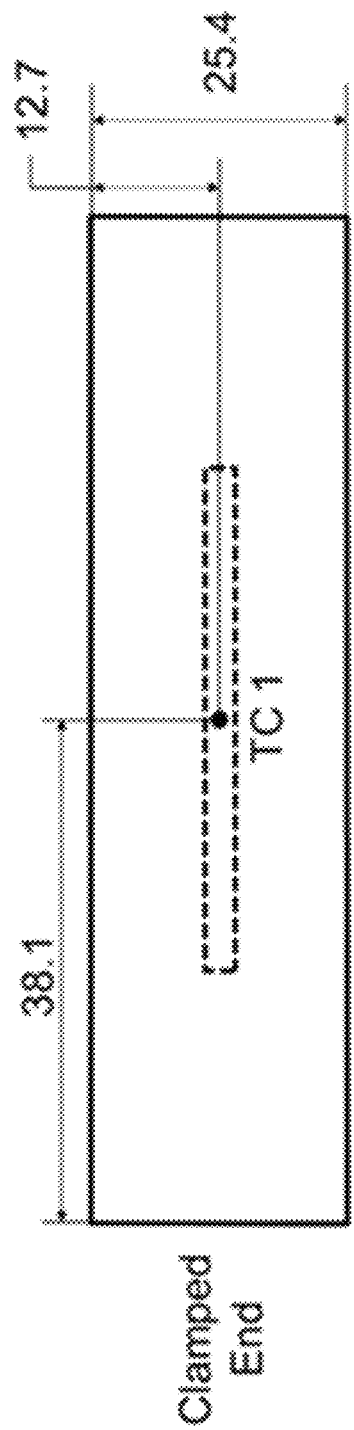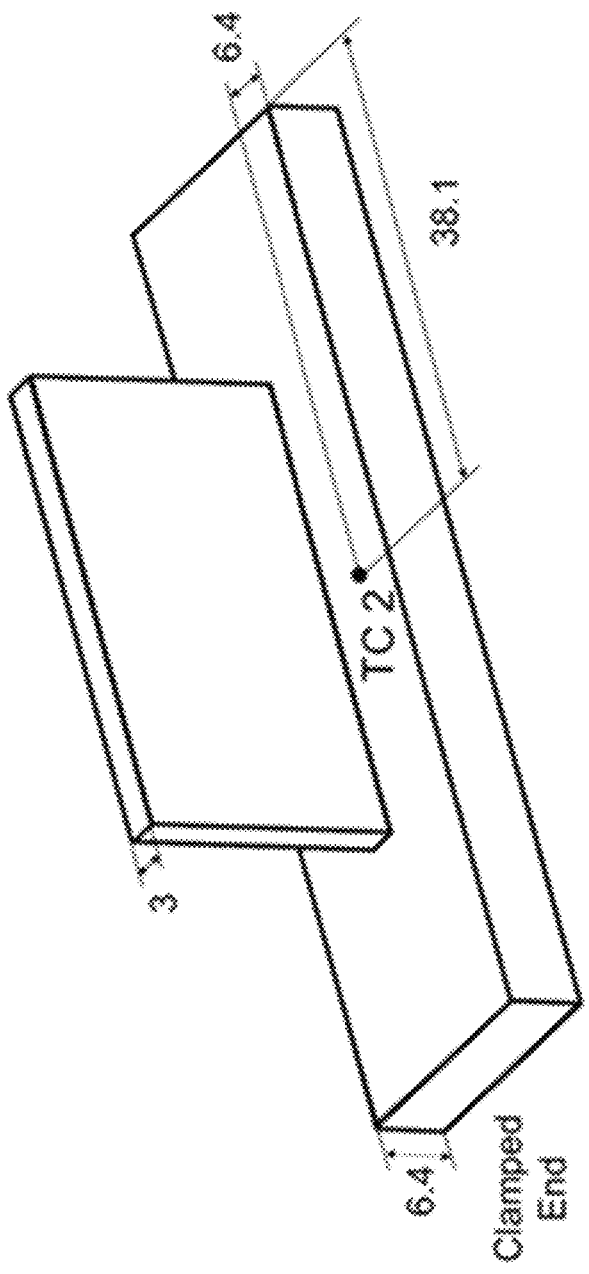
(a) Bottom View: Thermocouple location for Case B and Case C
(b) Thermocouple location for Case A
FIG. 6

Snapshots of the graph theory-based simulation for each case. The lack of dwell time in Case B and Case C leads to accumulation of heat in the top layers of the part.

THERMAL MODELING OF ADDITIVE MANUFACTURING USING GRAPH THEORY

CLAIM OF PRIORITY

This application claims benefit of U.S. Patent Application No. 63/090,617, filed on Oct. 12, 2020, which is incorporated herein by reference in its entirety.

FEDERALLY SPONSORED RESEARCH OR DEVELOPMENT

This invention was made with government support under Grant No. CMMI1752069 awarded by the U.S. National Science Foundation. The government has certain rights in the invention.

TECHNICAL FIELD

This disclosure relates to improvements to additive manufacturing processes.

BACKGROUND

Additive manufacturing (e.g., three-dimensional printing) is a process in which layers of material are sequentially applied and fused together. Inadequate heat dissipation can lead to failure of AM manufactured parts.

Metal additive manufacturing (AM/3D printing) offers unparalleled advantages over conventional manufacturing, including greater design freedom and a lower lead time. However, the use of AM parts in safety-critical industries, such as aerospace and biomedical, is limited by the tendency of the process to create flaws that can lead to sudden failure during use. The root cause of flaw formation in metal AM parts, such as porosity and deformation, is linked to the temperature inside the part during the process, called the thermal history. The thermal history is a function of the process parameters and part design.

Consequently, the first step towards ensuring consistent part quality in metal AM is to understand how and why the process parameters and part geometry influence the thermal history. Given the current lack of scientific insight into the causal design-process-thermal physics link that governs part quality, AM practitioners resort to expensive and time-consuming trial-and-error tests to optimize part geometry and process parameters.

An approach to reduce extensive empirical testing is to identify the viable process parameters and part geometry combinations through rapid thermal simulations. However, a major barrier that deters physics-based design and process optimization efforts in AM is the prohibitive computational burden of existing finite element-based thermal modeling.

SUMMARY

The present disclosure is directed to a novel graph theory-based computational thermal modeling approach for predicting the thermal history of titanium alloy parts made using the directed energy deposition metal AM process. As an example of the results obtained for one of the three test parts studied in this work, the temperature trends predicted by the graph theory approach had error ~11% compared to experimental trends. Moreover, the graph theory simulation was obtained within 9 minutes, which is less than the 25 minutes required to print the part.

Advantageously, the described systems and techniques may provide for one or more benefits, such as computationally efficient yet highly accurate computer simulations of heat distribution in AM parts formed by directed energy deposition (DED). For example, implementations described herein can reduce computation time to estimate the heat flux in AM parts as discussed below in reference to Table 11 and FIG. 16. For instance, depending on how much accuracy one desires, an operator could run a DED simulation using processes disclosed herein in as little as 9 minutes on a standard desktop computer.

The details of one or more implementations are set forth in the accompanying drawings and the description below. Other features, objects, and advantages will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

FIG. 1A illustrates an LPBF process schematic and FIG. 1B illustrates a DED process schematic in which metal powder is sprayed via nozzles and fused onto a substrate by a laser beam.

FIG. 2 illustrates lack-of-fusion defects in a titanium part made with LPBF. These same defects are common in DED.

FIG. 5A illustrates a schematic of the clamped substrate in relation to the thin wall, FIG. 5B illustrates the wall constructed in case A and case B, and FIG. 5C illustrates the wall constructed in case C.

FIG. 6 illustrates the thermocouple locations for each case.

Like reference symbols in the various drawings indicate like elements.

DETAILED DESCRIPTION

Metal additive manufacturing (AM) processes, such as laser powder bed fusion (LPBF) and directed energy deposition (DED), offer considerable advantages over other conventional manufacturing methods. While noteworthy differences between the two AM processes are discussed later, schematics of LPBF and DED are presented in FIG. 1. Compared to conventional subtractive processes, AM often requires lower lead times and allows for greater design freedom. However, inconsistencies in the process and part quality currently prevent AM from being widely accepted for critical applications. The part is often pervaded by heterogeneous microstructures and defects, such as pores and cracks. Process parameters can directly lead to the formation of certain defects. For instance, FIG. 2 depicts one type of defect that is caused by a phenomenon known as lack of fusion (LOF). Although the defects in FIG. 2 are taken from an LPBF part, LOF also appears in DED. As the name suggests, it occurs when the laser power is too low or the scan speed is too high, which results in incomplete melting of the metal powder particles. The part is then left with irregular voids, thus giving rise to potentially catastrophic stress concentrations.

Previous works have already proven graph theory to be a powerful tool in the thermal modeling of LPBF, e.g., M. R. Yavari, K. Cole, and P. Rao, "Thermal Modeling in Metal Additive Manufacturing using Graph Theory," *ASME Transactions, Journal of Manufacturing Science and Engineering*, vol. 141, pp. 071007-27, July 2019; M. R. Yavari, K. D. Cole, and P. K. Rao, "Design Rules for Additive Manufacturing—Understanding the Fundamental Thermal Phenomena to Reduce Scrap," *Procedia Manufacturing*, vol. 33, pp. 375-382, Jan. 1, 2019 2019; K. D. Cole, M. R. Yavari, and P. K. Rao, "Computational heat transfer with spectral graph theory: Quantitative verification," *International Journal of Thermal Sciences*, vol. 153, p. 106383, July 2020 2020; R. Yavari, J. Severson, A. Gaikwad, K. Cole, and P. Rao, "Predicting Part-Level Thermal History in Metal Additive Manufacturing Using Graph Theory: Experimental Validation With Directed Energy Deposition of Titanium Alloy Parts," in *ASME 2019 14th International Manufacturing Science and Engineering Conference*, 2019.

This work focuses on DED, which poses a greater challenge for any thermal model. There are currently very few thermal models that can provide an accurate and repeatable prediction for any given material and geometry in the DED process. The proposed graph-theoretic model, a mesh-free approach, could fill a large need for a dependable thermal model that can provide a predicted temperature distribution in a matter of minutes on a desktop computer.

Figure 3:
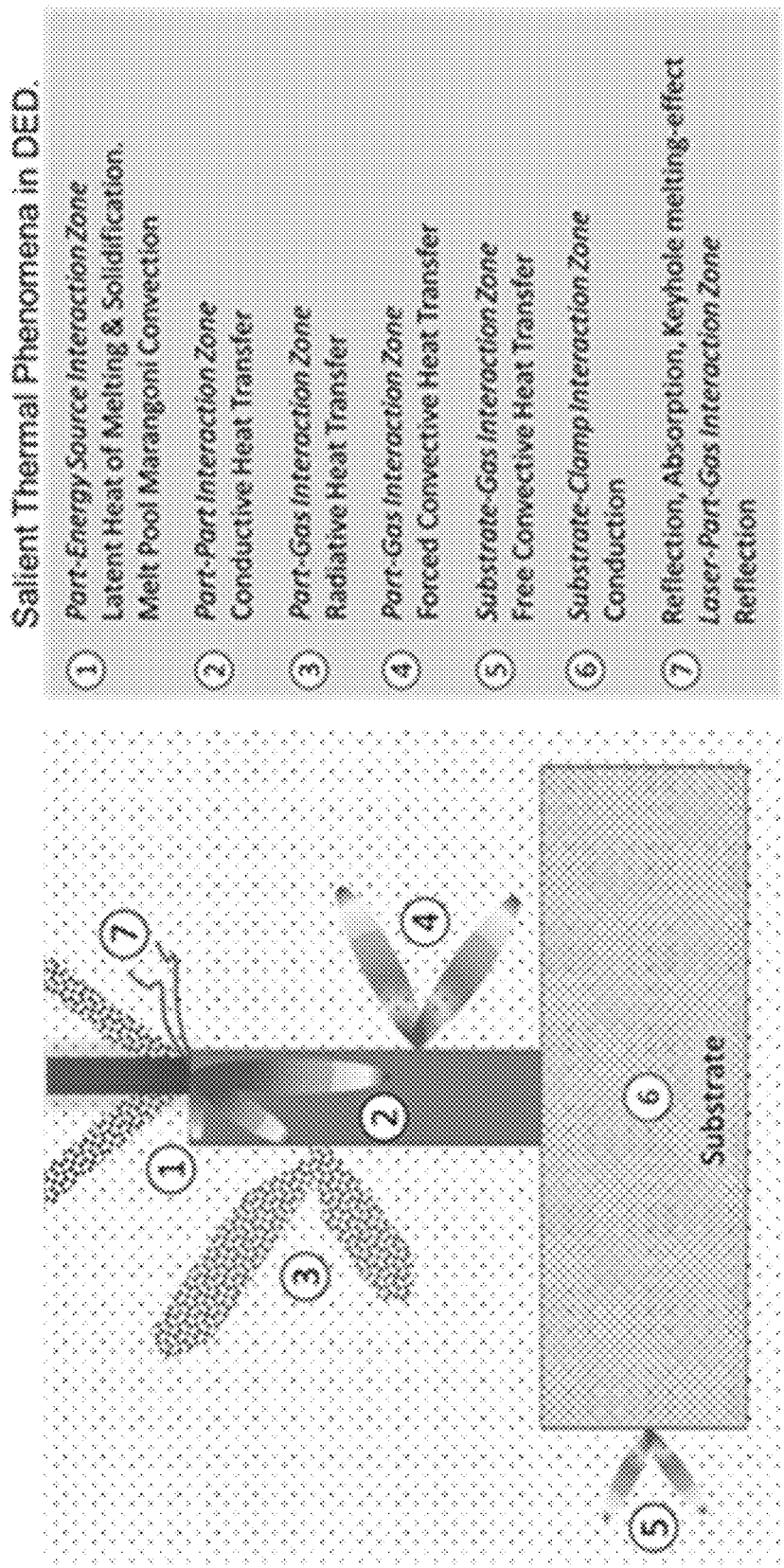
FIG. 3 illustrates salient thermal phenomena in DED include conductive, convective, and radiative heat transfer.

FIG. 3 outlines the salient thermal phenomena in DED. In FIG. 3, the phenomena labeled 3, 4, and 5 are unique to DED and are not present in the LPBF process. Consequently, certain heat transfer-related assumptions made in the context of the LPBF process to aid computation in our previous work must be relaxed for the DED process.

The first and most important difference between LPBF and DED is that in the former process, the part is surrounded by unfused powder material, viz., an insulating medium. Hence, heat loss on the top surface of the part occurs through radiation and forced convective heat transfer from the melt pool. Heat loss in the rest of the LPBF part occurs largely through conduction, albeit, heat loss through free convection occurs at the part-powder boundaries given air gaps in the unfused metal powder surrounding the part.

In contrast, as shown in FIG. 3, the part in DED is surrounded not by metal powder but by an inert gas, and therefore heat is lost to the surroundings through convection and radiation from all surfaces. Convection involves both free and forced convection, as the metal powder is delivered to the substrate via an inert carrier gas, such as argon. Consequently, for a comprehensive model of part-level thermal history in DED, it is necessary to account for heat loss through conduction, both free and forced convection, and radiation.

Second, the laser heat source-related assumptions in LPBF do not carry over to the DED process because the scan velocity and spot size (beam diameter) of the laser, and layer thickness are considerably different. In LPBF, the laser is moved by a set of mirrors and the mirrors are moved by galvanometers. By contrast, in DED, the laser head is translated by the physical motion of computer numerical controls (CNC), or in other words, CNC-based axes. Consequently, the scan velocity of the laser in DED is ten times slower compared to LPBF—the scan speed of the laser in LPBF is typically 200 to 500 mm·s$^{-1}$; in DED, the scan speed is on the order of 10 mm·s$^{-1}$. Further, the typical layer thickness is around 50 µm in LPBF, compared to −100 µm to 200 µm for DED. Lastly, the laser beam diameter in the DED process is typically nearer to the millimeter range compared to −50 µm to 100 µm in LPBF.

From a thermal modeling perspective, the higher laser scan velocity and smaller layer thickness of LPBF are advantageous for reducing the computation time. Researchers often simulate the deposition of multiple layers at a time in LPBF (called the super-layer or meta-layer assumption) to reduce the computation time. For example, Williams, et al. use the meta-layer assumption in an FE-model to predict thermal-induced deformation in LPBF. Meta-layers ranging from 12 to as large as 50 times the actual layer thickness (50 µm) are simulated. Williams, et al. show that their model predicts distortion within 5% of measurements, despite simulating the deposition of −15 layers at a time. The slow scan speed and large laser spot size of DED ensure that the melt pool has a large diameter and penetrates deeper into the previous layers compared to LPBF. Consequently, the meta-layer assumption is not viable in DED.

The present disclosure provides a graph theory approach for thermal modeling for AM in the context of the DED process. In the DED process, material in the form of powder is melted on account of energy supplied by a laser. Metal powder material in aerosolized form is delivered onto the substrate via nozzles and injected into the path of a high-power laser. The thermal phenomena at the melt pool scale, coupled with the part-level temperature distribution, influence the formation of defects and govern the microstructural evolution. These thermal aspects in turn are linked to the process parameters and design of the part. Consequently, the first step towards ensuring consistent part quality in DED is to understand the fundamental link between the process parameters, thermal phenomena, and part properties.

The graph theory approach for thermal modeling in AM has been published in the context of an LPBF thermal modeling process disclosed in International Patent Application PCT/US2019/051192, SIMULATING HEAT FLUX IN ADDITIVE MANUFACTURING, the contents of which are hereby incorporated by reference in their entirety. Theoretical verification with finite element (FE) modeling shows that the graph theory approach predicts the temperature distribution in LPBF parts within about $\frac{1}{10}^{th}$ of the time required by commercial FE solutions and with errors fewer than 10%. The approach has also been validated with experimental data from the LPBF process. The author now takes this work forward by validating the approach in terms of the DED experiment run by Heigel, et al. J. C. Heigel, P. Michaleris, and E. W. Reutzel, "Thermo-mechanical model development and validation of directed energy deposition additive manufacturing of Ti-6Al-4V," *Additive Manufacturing*, vol. 5, pp. 9-19, Jan. 1, 2015 2015; J. C. Heigel, "Thermo-Mechanical Model Development and Experimental Validation for Directed Energy Deposition Additive Manufacturing Processes," Doctor of Philosophy Dissertation, Mechanical Engineering, Pennsylvania State University, State College, PA, 2015.

Simulation

Determination of an AM part's thermal history is crucial to its functional integrity. Various approaches have been taken by researchers to model the DED process. The majority have attempted to simulate the process with finite element analysis (FEA) by transferring the same principles that apply in weld modeling. For certain process phenomena, weld modeling principles are transferrable. For instance, the double ellipsoid model proposed by Goldak is commonly used to approximate the melt pool shape and temperature in DED. Goldak's model was originally developed for welding. A version of the double ellipsoid model is used in this work to describe the laser heat source.

Conversely, a major difference between DED and welding relates to the volume of the deposited material. In the welding process, the newly deposited material often composes a small fraction of the overall part since welding often only occurs along seams and junctions. As a result, most of the heat from the weld pool is quickly conducted away. However, in the DED process, the deposited material composes most, if not all, of the final part. This means that the entire part remains at a much higher temperature than those seen in welding since it was only recently deposited and solidified. Not only are temperatures in DED much higher as a result of the increased amount of newly deposited material, that material is also exposed to those higher temperatures for a much longer period of time. The combination of higher temperatures and longer exposure makes convective heat loss much more prevalent in DED than it does in welding processes. Therefore, a new consideration for convection must be developed for the DED process.

Numerous approaches to a new approximation for convection loss in DED have been studied. Attempting to apply an assumption common in weld modeling, some researchers have considered convective heat loss to be negligible in DED. Others have implemented convection into their DED models by assuming it to be uniformly distributed over all surfaces. In those cases, they considered the heat loss to be equal to free convection loss in air. Furthermore, some researchers have considered the forced nature of the shield gas in the process by employing a higher convection that is uniformly applied to all free surfaces. Still others have taken it a step further by using tools such as empirical equations or computational fluid dynamics to develop a more complex convection model. Finally, an effort to develop a measurement-based, forced convection model was proposed and tested by Heigel, et al. Gouge, et al. detailed a comprehensive comparison between their convection model and other assumed convection regimes M. F. Gouge, J. C. Heigel, P. Michaleris, and T. A. Palmer, "Modeling forced convection in the thermal simulation of laser cladding processes," *The International Journal of Advanced Manufacturing Technology*, vol. 79, pp. 307-320, Feb. 4, 2015 2015. From their findings, they argue that a forced convection model will produce more accurate simulation results than a model that considers only free convection or no convection at all.

In this current work, a combination of free and forced convection regimes is considered and applied to the part surfaces. The convection coefficients are compared to those used by Heigel, et al. for different flow regimes in Table 1. The values used in the graph-theoretic approach are discussed in more detail later in the paper. Other notable assumptions used by Heigel, et al. were as follows: they assumed thermal symmetry, thus modeling only the half-symmetry of the part, and they included the clamp in their model. In contrast, the graph-theoretic model included the entire 3-D part geometry but not the clamp. Nevertheless, an approximation for heat loss to the clamp was applied in the graph-theoretic approach and will be described in more detail later in the paper.

TABLE 1

Heat transfer coefficients used to approximate convective heat loss from part surfaces.

| Heat Transfer Coefficient | Graph Theory (this work) [W · m$^{-2}$ · K$^{-1}$] | Heigel's Model [W · m$^{-2}$ · K$^{-1}$] |
| --- | --- | --- |
| Free | 5.3 | 10 |
| Forced | 49.1 | 25-60 |

As previously mentioned, finite element modeling for welding processes forms the foundation on which DED modeling has been built. It is common for some parts produced by DED to have in excess of 1000 layers, which far exceeds the scope of traditional weld modeling. Considering the sheer size and complexity of many of the parts produced by DED though, it becomes evident that the modeling of this process introduces a significant computational load. Consequently, there exists a considerable need for an accurate and fast computational approach to determine a part's thermal history. In search of a computationally efficient model, a variety of commercial software have been used to simulate the deposition process. One technique that was specifically developed for the simulation of additive manufacturing processes was introduced by Panagiotis Michaleris. P. Michaleris, "Modeling metal deposition in heat transfer analyses of additive manufacturing processes," *Finite Elements in Analysis and Design*, vol. 86, pp. 51-60, Apr. 28, 2014 2014. In an effort to increase computational efficiency, Michaleris proposed and tested two material deposition methods: (1) the use of quiet and (2) inactive elements. The quiet approach assigns material properties to elements that have not yet been deposited such that they do not affect the overall analysis. In contrast, the inactive approach does not even include elements in the analysis until they have been deposited, at which point they are activated. Although the underlying mathematical theory is different, the novel technique (graph theory) employed in this work uses a similar inactive element method.

Results from our previous work, which employed the graph-theoretic approach, showed that it was about ten times faster than the benchmark Goldak model used in conjunction with Abaqus, an FE method; International Patent Application PCT/US2019/051192. In addition, the mean absolute percentage error of the graph-theoretic approach was less than 10%, relative to the FE analysis.

It is necessary to validate any thermal model in order to assess its prediction accuracy and capabilities. The best way to validate is through experimentation. This current work used data from other literature for validation of the graph-theoretic approach. The experimental data used in this work was acquired via thermocouples, which are contact sensors that are well established for the purpose of in-situ temperature monitoring. Yan, et al. reviewed different part-level thermal measurement approaches for AM in a recent paper Z. Yan, W. Liu, Z. Tang, X. Liu, N. Zhang, M. Li, et al., "Review on thermal analysis in laser-based additive manufacturing," *Optics & Laser Technology*, vol. 106, pp. 427-441, Oct. 1, 2018 2018. That review paper also includes a summary of numerical models for AM and corresponding validation efforts by various researchers. Among the validation efforts are many that use contactless measurement techniques, which are the most common for determining melt pool temperatures.

Despite considerable advances in in-situ monitoring techniques for AM, some inconsistencies remain regarding melt pool behavior and temperature distribution. A summary of observed, as well as predicted melt pool temperatures found by different researchers is presented in Table 2 for DED of Ti-6Al-4V. The three different melt pool temperatures considered in this work: 1900° C., 2200° C., and 2450° C., were chosen to represent the range of values observed and measured in the literature.

TABLE 2

Summary of melt pool temperatures found by other researchers.

| Geometry | Laser Power [W] | Scan Speed [mm · s⁻¹] | Method | Melt Pool Temperature [° C.] |
|---|---|---|---|---|
| Thin Wall | 425 | 8.5 | Inactive Element Technique | 1800-2000 |
| Thin Wall | 300 | 12.7 | Pyrometer | ~1850 |
| Thin Wall | 290 | 12.7 | Pyrometer | 1900-2000 |
| Rectangular Thin Wall | 300 | 2.0 | Quiet Element Technique | 2447 |
| Cube | 800 | 10.0 | In-house Code (GAMMA) | 2500 |
| L-shaped Thin Wall | 450 | 10.6 | IR Camera | 2485 ± 161 |
| Cylinders | 350 | 16.9 | Pyrometer | 2100-2500 |

Experiments

Figure 4:
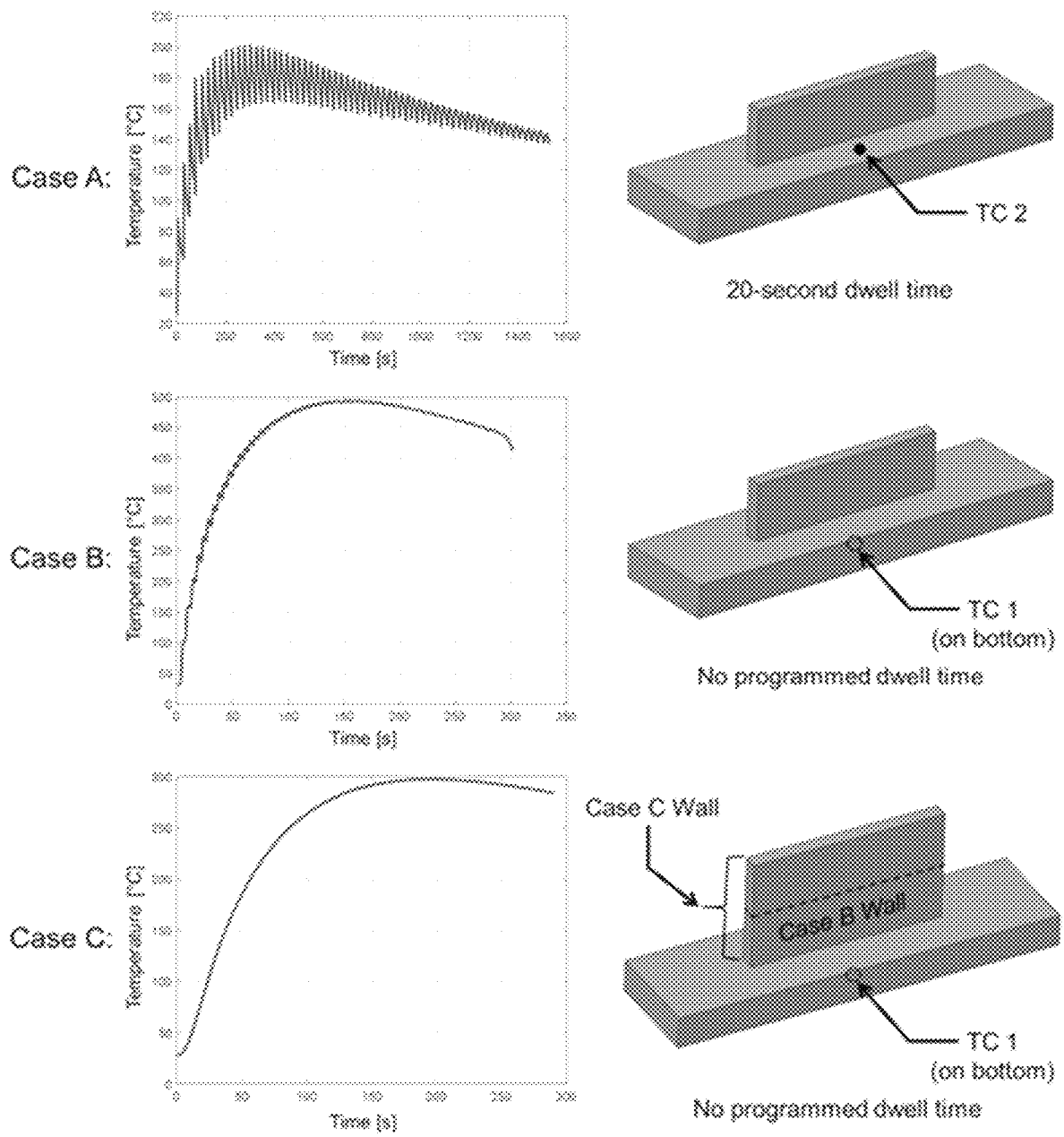
FIG. 4 illustrates experimental data for each deposition case along with the corresponding thermocouple location and dwell time.

The experimental data for this work, shown in FIG. 4, was acquired from Heigel, et al. In their experiments, three so-called single-track thin walls were deposited with an Optomec® LENS MR-7 system. In a single-track thin wall, material in a layer was deposited in a single pass (i.e., a layer has only one hatch). The part material used was Ti-6Al-4V powder, which was delivered to the melt pool by a stream of inert argon gas. The gas passed through four nozzles that were positioned concentrically around the fiber laser's beam. These nozzles directed the argon gas and titanium powder mixture into the melt pool, where the argon gas shielded the melt pool while new powder particles entered the laser beam and were melted into a rapidly solidifying layer. The laser used in the process was a 500 W IPG Photonics fiber laser with a diameter of 1.5 mm. As this cyclic process was repeated, the single-track thin walls were manufactured layer by layer. The walls were deposited onto their own Ti-6Al-4V substrate with dimensions 76.2 mm×25.4 mm×6.4 mm (L×W×H). Each substrate was clamped at one end, as depicted in FIG. 5(a). Table 3 summarizes the process conditions for each case. The distinguishing characteristics of the three deposition cases, labeled A through C, are outlined below and shown in FIG. 5.

Case A: A single-track wall including 62 layers with a programmed 20-second dwell time between each subsequent layer, also called the inter-layer cooling time. Deposition direction alternated for each layer. In other words, the laser traveled in one direction for odd-numbered layers and the opposite direction for even-numbered layers. The 20-second dwell refers to the added pause after the laser had reached the start position, before deposition of the next layer. The addition of dwell time between each of the 62 layers resulted in a substantially longer production time of 20 minutes to the no-dwell Case B described below. Because of the dwell between layers there was a longer time for the heat to dissipate into the substrate before new material at higher temperature was deposited.

Case B: A single-track wall including 62 layers deposited without any programmed dwell time. The author notes that there was an inherent pause of 3 seconds between the end of one layer and the beginning of the next as the deposition head repositioned and resumed powder flow. It was assumed that the inherent dwell time in between layers was 3 seconds.

Case C: A single-track wall including 62 layers without any programmed dwell time. As in Case B, the inherent dwell time of 3 seconds is considered. This wall was deposited on top of the pre-existing wall described as Case B. To explain further, the thin wall in Case B was allowed to cool down to ambient temperature before deposition of the additional wall layers was initiated. The result was a single-track wall that was essentially twice the height of the Case A and Case B walls and consisted of 124 deposition layers in total.

FIG. 4 illustrates the experimental data for each deposition case (A-C) along with the corresponding thermocouple location and dwell time. FIG. 5A illustrates a schematic of the clamped substrate in relation to the thin wall, FIG. 5B illustrates the wall constructed in case A and case B, and FIG. 5C illustrates the wall constructed in case C.

TABLE 3

Process conditions for each case, detailed by Heigel et al.

| Case | A | B | C |
|---|---|---|---|
| Measured Laser Power [W] | 415 | 410 | 415 |
| Travel Speed [mm · s⁻¹] | | 8.5 | |
| Powder delivery rate [g · min⁻¹] | | 3.0 | |
| Additional dwell time [s] | 20 | 0 | 0 |
| Wall height [mm] | 10.7 | 11.2 | 23.2 |
| Measured wall length [mm] | 37.2 | 39.2 | 39.3 |
| Measured wall width [mm] | 2.2 | 3.0 | 3.1 |
| Measured Layer thickness [mm] | 0.1726 | 0.1806 | 0.1871 |
| Laser spot size [mm] | | 1.5 | |
| Standoff Distance [mm] | | 11.4 | |

FIG. 4 illustrates the experimental data for each deposition case (A-C) along with the corresponding thermocouple location and dwell time. FIG. 5A illustrates a schematic of the clamped substrate in relation to the thin wall, FIG. 5B illustrates the wall constructed in case A and case B, and FIG. 5C illustrates the wall constructed in case C.

Temperature measurements were acquired using Omega GG-K-30 type K thermocouples. Thermocouple (TC) 1 was located at the center of the substrate's bottom surface. Thermocouple 2 was located beside the thin wall's base, on the top surface of the substrate. These thermocouples were not bolted onto the substrate but appear to be brazed or spot welded to the substrate. As stated by Heigel, et al., an aluminum foil tape was used to shield the top thermocouple (TC 2) from forced convection effects during deposition of Cases A and C. However, the tape was not used during Case B, and hence temperature measurements from TC 2 were not used. Thermocouple positions are depicted in FIG. 6.

Simulation Procedure

Figure 7A:
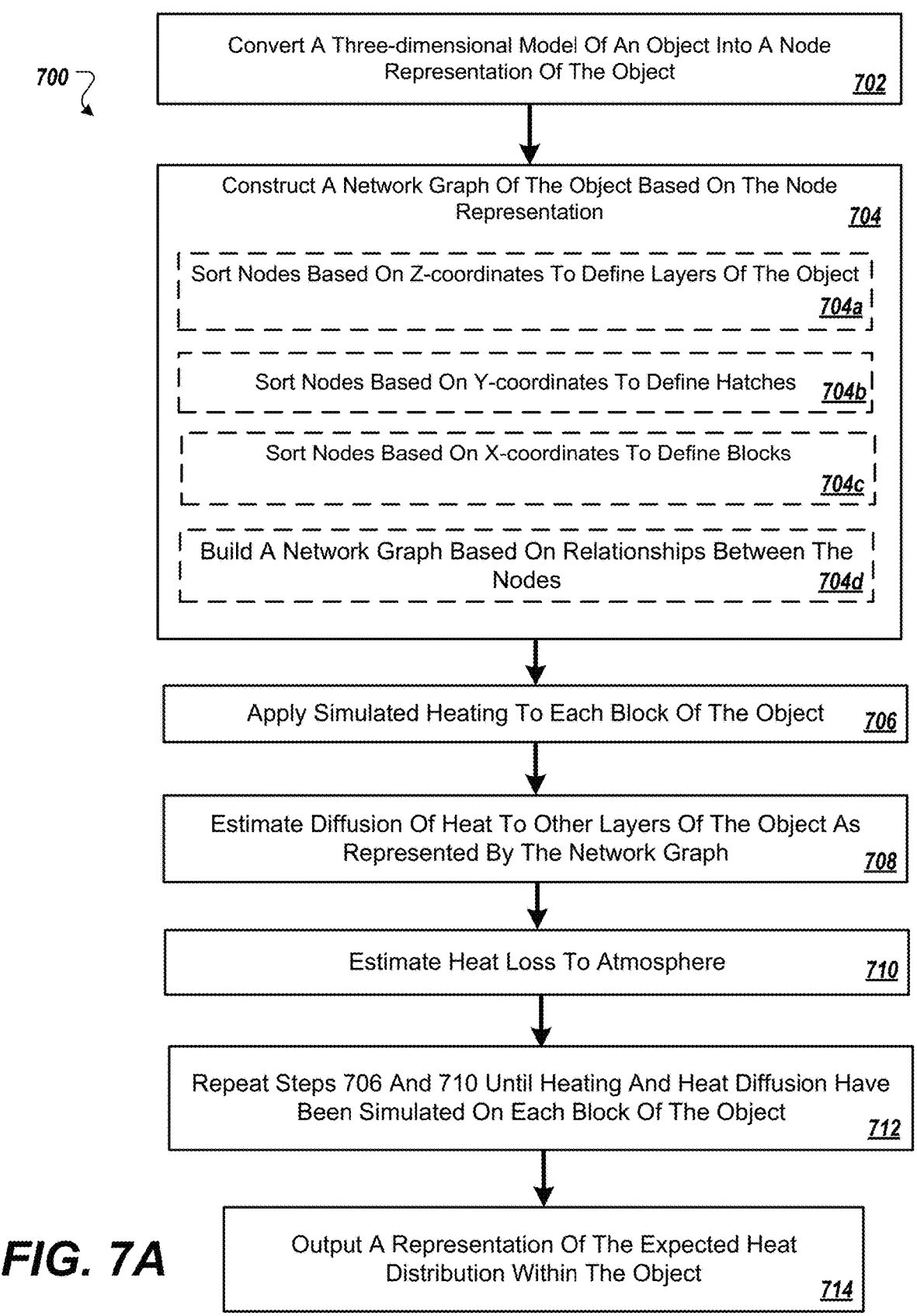
FIG. 7A illustrates an example process for modeling heat flux in AM parts that can be executed in accordance with implementations of the present disclosure.
Figure 7B:
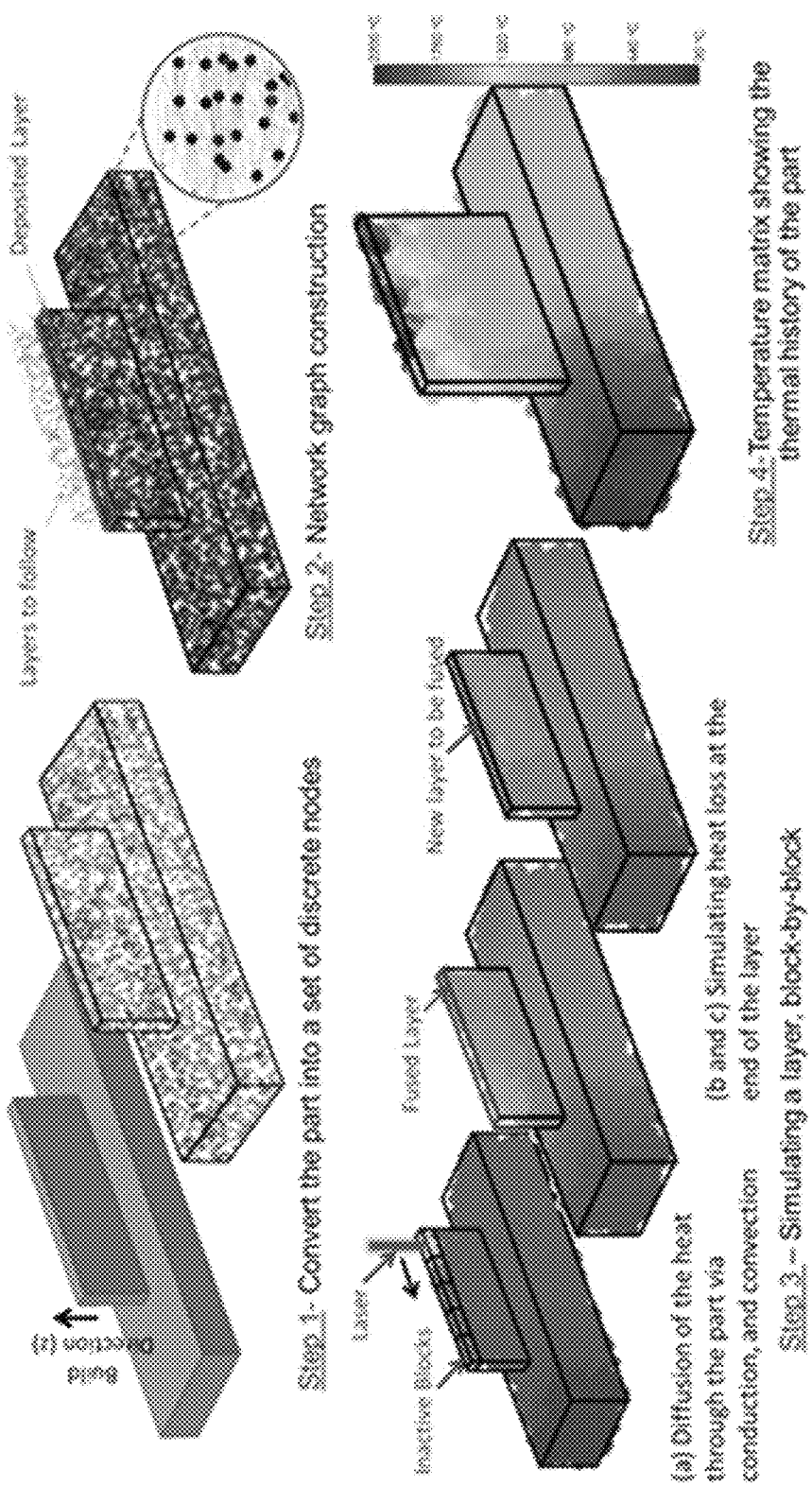
FIG. 7B illustrates representation of the four steps in the graph-theoretic approach for the DED process.

FIG. 7A depicts an example process 700 for modeling heat flux in AM parts during a DED process. Process 700 can be executed in accordance with implementations of the present disclosure. The example process 700 can be implemented, for example, by one or more computing systems. Exemplary computing systems can include, but are not limited to, a super computer, a desktop computer, a laptop computer, or a tablet computer. In some examples, the example process 700 can be provided by one or more computer-executable programs executed using one or more computing devices. For example, the example process 700, or portions thereof, can be provided by one or more programs executed by a computing system. FIG. 7B illustrates graphical representations of the steps of process 700.

Figure 7C:
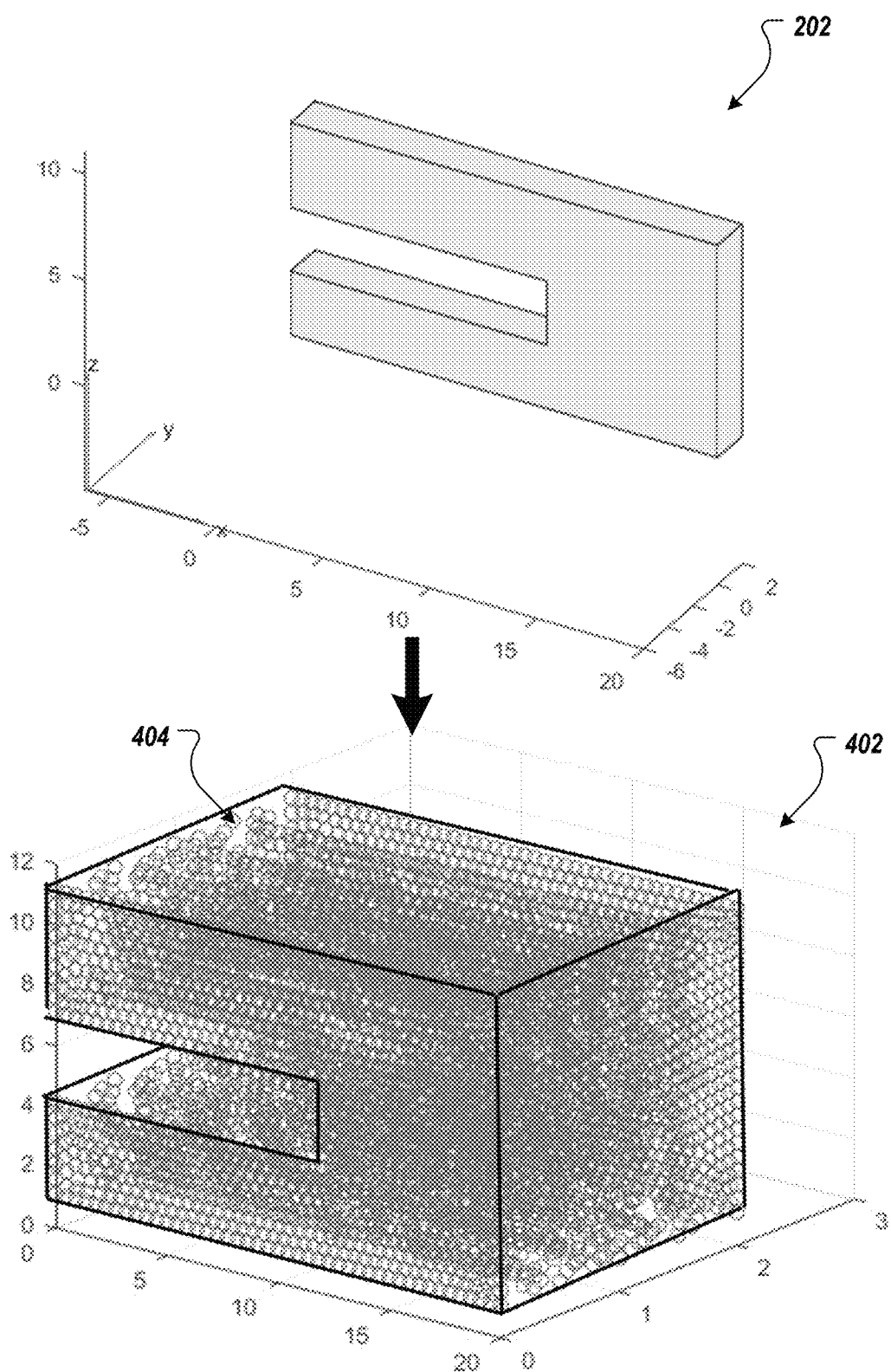
FIG. 7C depicts a graphical illustration of the conversion of a three-dimensional model of an AM part into a node representation.

The computing system converts a three-dimensional model of an AM part into a node representation of the AM part (702). For example, a fixed number of spatial locations within the part are randomly sampled. The heat flux through the part is observed at these fixed spatial locations, termed nodes. In other words, the volume of the part to be simulated is randomly populated with nodes; the number of nodes is set at a certain number per unit volume (called node density). This discretization results in each node having a unique Cartesian (x, y, z) coordinate, i.e., the location of each node is spatially defined within the part. The random sampling of the nodes reduces the computational burden of the approach. The number of nodes is contingent on the geometry of the part. FIG. 7C depicts a graphical illustration of the conversion of a three-dimensional model of an AM part into a node representation.

Figure 7D:
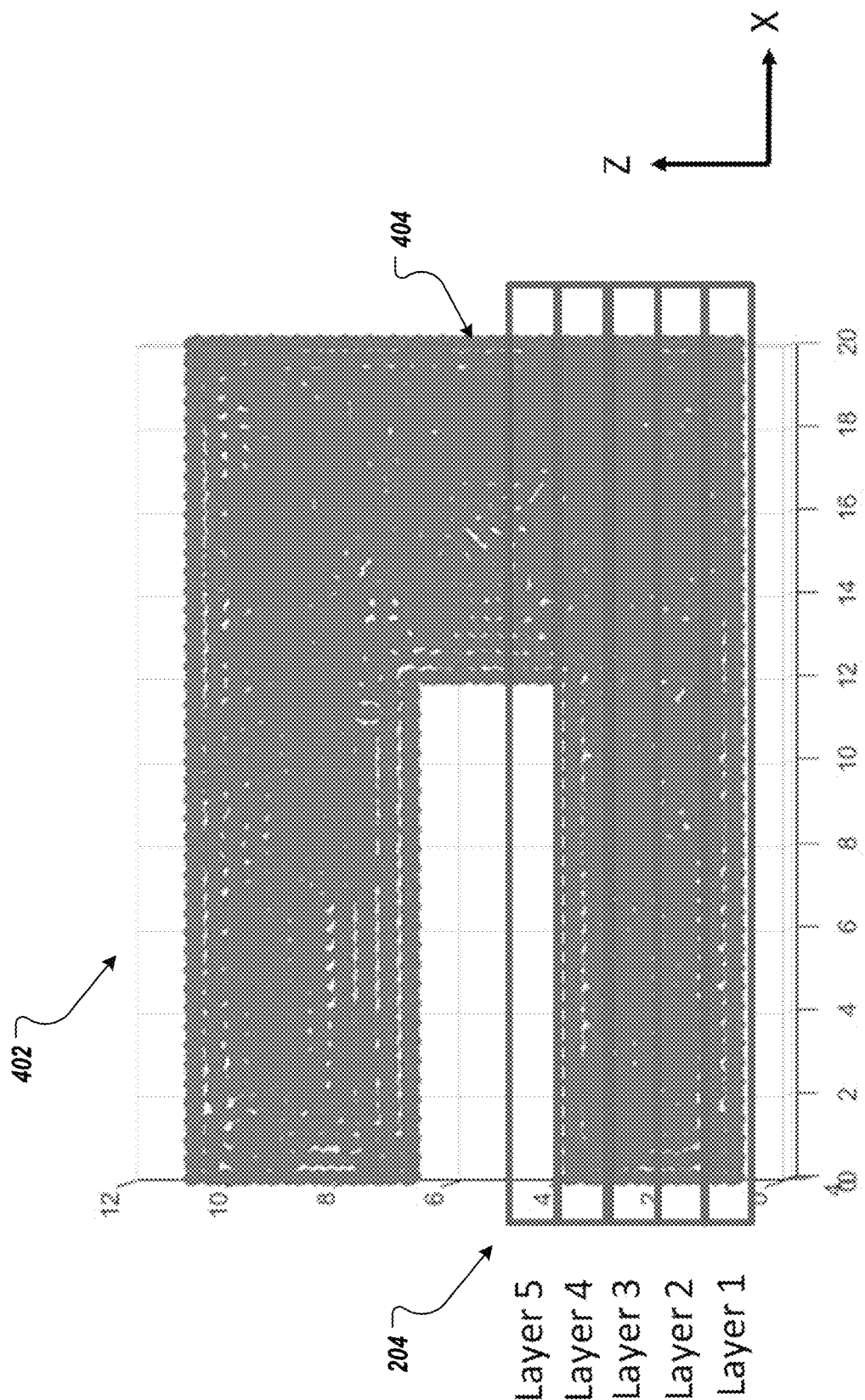
FIG. 7D depicts a graphical representation of nodes being sorted into layers.
Figure 7E:
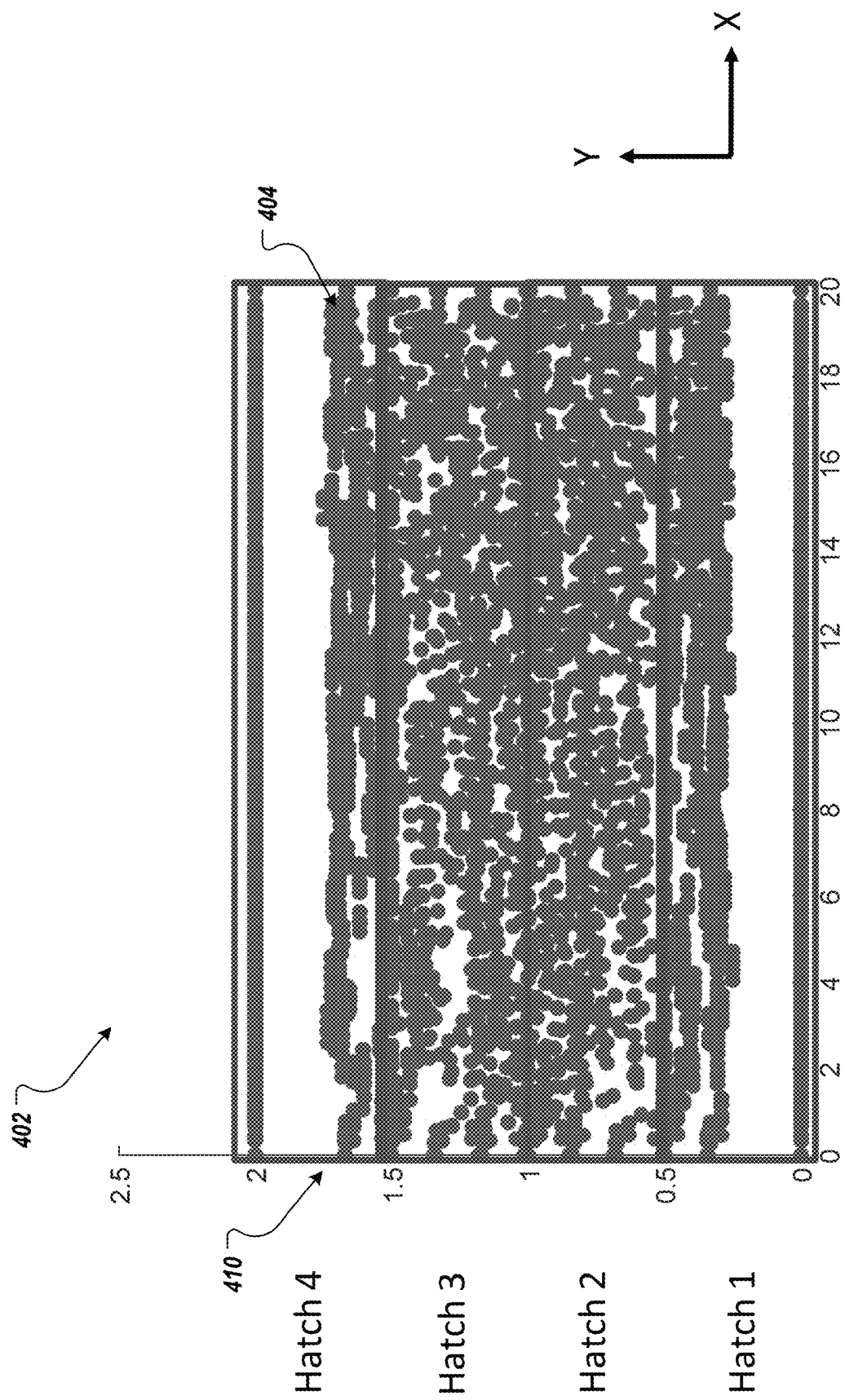
FIG. 7E depicts a graphical representation of nodes being sorted into hatches.
Figure 8:
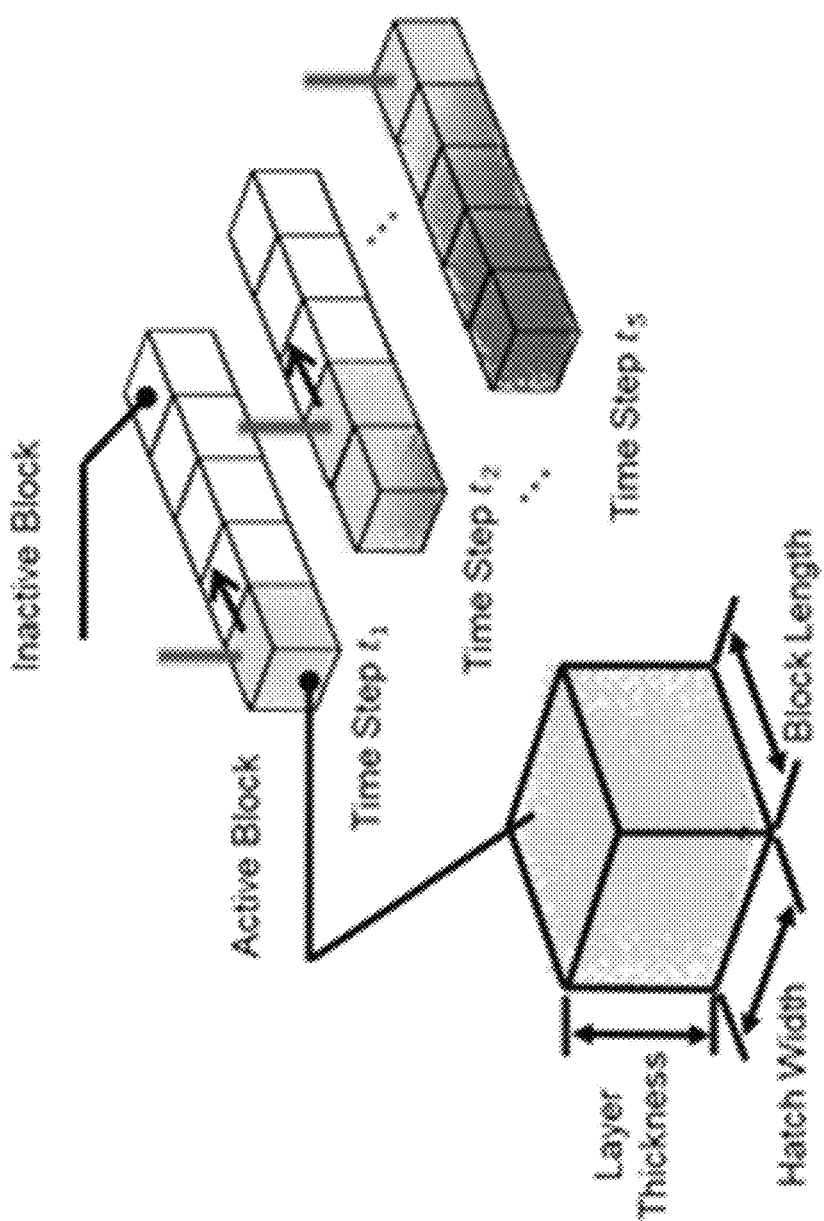
FIG. 8 illustrates a block-by-block heating scheme used in graph theory DED simulation.
Figure 9:
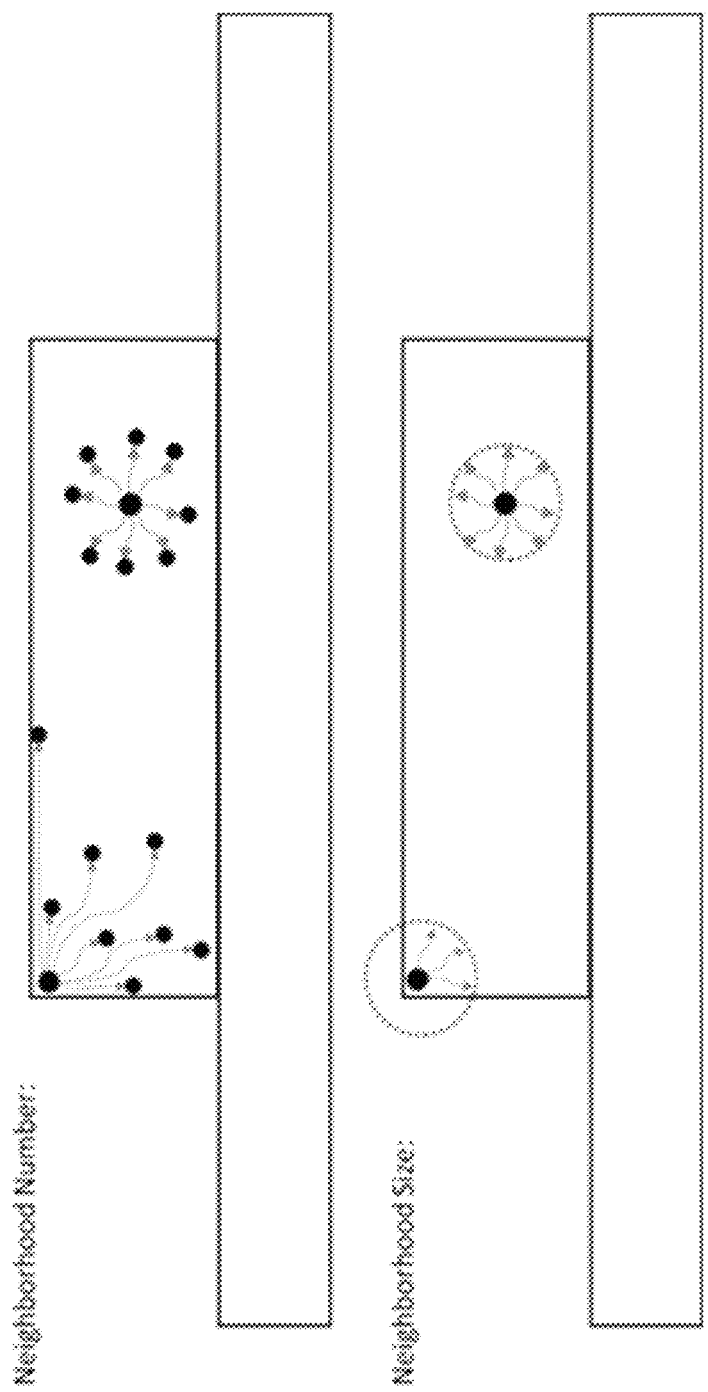
FIG. 9 illustrates heat transfer with neighborhood number vs. neighborhood size.

Next, each layer is divided into a hatch (in the case of a thin wall, each layer has only one hatch), and each hatch is further divided into discrete blocks (volumes) with a fixed height and length, with breadth equal to the hatch width. An example block is illustrated in FIG. 8. The computing system generates network graph of the AM part based on the node representation (704). Step 704 can include four sub-steps. The sub-steps can include: sorting nodes based on z-coordinates to define layers of the object (704a). FIG. 7D depicts a graphical representation of nodes being sorted into layers. Sorting nodes based on y-coordinates to define hatches (704b). FIG. 7E depicts a graphical representation of nodes being sorted into hatches. Sorting nodes based on X-coordinates to define blocks (704c). FIG. 8 depicts a graphical representation of nodes being sorted into blocks. In some implementations, the hatch and block widths and lengths are related to the size of a DED nozzle being simulated. For instance, the width of the hatch and block is comparable to the size of DED layer printed by a particular type or size nozzle. In some implementations, block lengths can be related to both nozzle size and the velocity at which the simulated nozzle is moved (or expected to be moved) across a part. For example, block length can be determined based on the nozzle velocity and a predetermined time step size. In such implementations, the block length would be the product of the nozzle velocity and the size of the time step.

For the example described herein, the single track or hatch that composes each deposited layer will be broken up into five equal blocks. These discrete blocks are 7.84 mm long, 3 mm wide, and 0.1806 mm thick. There are a total of 2830 blocks in the part. The reason for dividing a hatch into blocks is explained in the context of Step 3 (FIG. 8). Since the nodes are populated in a random manner, there is a degree of uncertainty in the model predictions. This uncertainty can be quantified by repeating the simulations three times for each case.

Figure 7F:
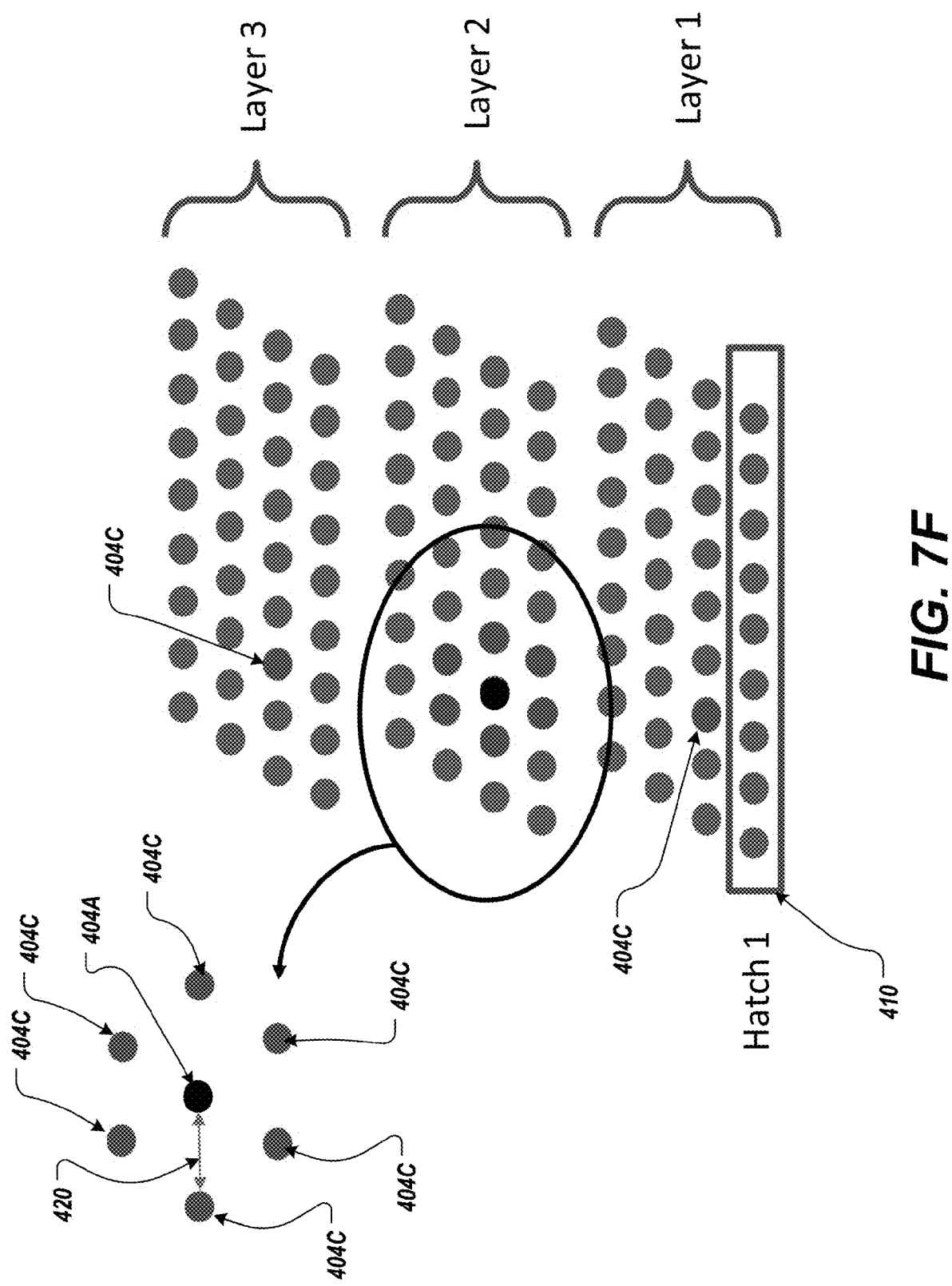
FIG. 7F depicts a graphical representation of generating a weight for a node of an adjacency matrix based on neighbouring nodes.

Building an network graph based on relationships between the nodes (704d). FIG. 7F depicts a graphical representation of generating a weight for a node of an network graph based on neighbouring nodes. In more detail, the computing system calculates a graph over the set of nodes sampled in Step 702. Each node is connected to its nearest neighboring nodes within a ε-radius. Consider ε [mm] as describing the radius of a sphere around a node at the center of the sphere. Nodes that fall within the volume of the sphere are connected to the node at the center of the sphere. Nodes that are outside of the sphere are not connected. This step is completed throughout the entire cloud of nodes, which results in a complex web of connections called a network graph.

Consider two nodes, $\pi_i$ and $\pi_j$, whose spatial Cartesian coordinates are $c_i \equiv (x_i, y_i, z_i)$ and $c_j \equiv (x_j, y_j, z_j)$, respectively; $\pi_i$ and $\pi_j$ are connected by an edge having weight $\alpha_{ij}$ if the distance between them is less than ε, $$a_{ij} = \begin{cases} e^{-(c_i-c_j)^2/\sigma^2} & \text{if}(c_i - c_j)^2 \le \varepsilon \\ 0 & \text{otherwise} \end{cases} \quad (1)$$

In Eqn. (1), σ is the standard deviation of all the pairwise distances between nodes, and the exponential term is the Gaussian function that scales the distance between the nodes in the part between 0 and 1. Nodes that are farther away from each other have an edge with a smaller weight connecting each other; nodes closer to each other are connected with an edge with a larger weight, $$\lim_{(c_i-c_j) \to 0} a_{ij} = 1 \quad (2)$$

$$\lim_{(c_i-c_j) \to \varepsilon} a_{ij} = 0$$

The neighborhood distance c is a heuristic tunable parameter in the graph theory model, that needs to be calibrated (only once) for a material type. The calibration procedure for ε is described in below.

The matrix formed by placing $a_{ij}$ in a row i and column j is called the network graph, $A=[a_{ij}]$, which is a positive symmetric matrix. From the network graph, the degree $h_i$ of a node $Tr_i$ is calculated by summing the corresponding $i^{th}$ row (or column) of A, $h_i = \Sigma_{\forall j} a_{ih}$. The graph Laplacian at node $\pi_i$ is defined as: $l_{ij} \stackrel{\text{def}}{=} h_i - a_{ij}$, and the Laplacian matrix is obtained $L=[l_{ij}]$. Finally, the eigenspectra of the graph Laplacian matrix (L) will be computed as L$\phi$=, where $\phi$ are the eigenvectors and $\Lambda$ are the eigenvalues of L.

The fusion of each layer is simulated block-by-lock by applying simulated heat to a layer of the AM part as represented by the network graph (706). For example, the DED simulation proceeds by heating the nodes in a block, before proceeding to the nodes in the next block. In other words, a time step involves heating of nodes inside a block, one block at a time. FIG. 8 demonstrates the block-by-block heating scheme used in this work. Since the laser scan velocity is 8.5 mm·s$^{-1}$ and the length of each block is 7.84 mm long, the time to step between blocks is 0.922 s.

The diffusion of heat to other layers of the AM part as represented by the network graph is estimated (708). After a block is heated by the laser, the heat is allowed to diffuse through the network graph that was constructed in step 704. Conduction is the sole mode of heat transfer between the nodes. The only nodes active during this step are the ones located within layers and blocks that have already been deposited. Other nodes that are in subsequent blocks and layers remain inactive and therefore unable to transfer heat. After the heat diffuses from the block that had just been heated by the laser, the deposition of the next block is simulated. This process is repeated for every block and every layer in the part. The mathematical implications of the approach will be summarized here by only including the final derived equation, shown in Eqn. (3).

After time step $t_b$ (=0.922 s), viz., the time required to process each block, the temperature of each active node is contained in the temperature matrix $T_b$. The temperature following heat transfer by conduction ($T_c$) is defined as a function of the Laplacian eigenvectors ($\phi$)) and eigenvalues ($\Lambda$) of the network graph over active nodes, where $T_0$ is the melt pool temperature, and g is a tunable parameter called the gain factor (g). The gain factor (g) scales the rate of thermal diffusivity or heat flux between nodes. A higher gain factor increases the rate of thermal diffusion through the part, i.e., the larger the gain factor, the faster the heat will dissipate through the part by conduction. The procedure to calibrate the gain factor is reported in below.

$$T_c = \phi e^{-ag\Lambda t_b} \phi' T_0 \tag{3}$$

The heat lost to the atmosphere is estimated (708). Heat transfer by conduction between the nodes is followed in tandem with heat loss through forced and free convection from the nodes on the surface of the part. The temperature distribution after heat loss through forced and free convection, and through clamp conduction takes place for the duration of the time $t_b$, and is obtained as, $$T_b = T_c e^{-\beta t_b} \tag{4}$$

$$\beta = \frac{h}{\rho \times L \times c_p}$$

Where h [W m$^{-2}$·m$^{-2}$·K$^{-1}$] is the heat transfer coefficient, $\rho$ is the material density [kg·m$^{-3}$], and L (=7.84 mm) is the length of the block, and $C_p$ is the specific heat [J·kg$^{-1}$·° C.$^{-1}$] which is not a constant, but temperature-dependent in this work. The derived coefficient, $\beta$, is called the inverse time constant [s$^{-1}$]. The heat transfer coefficient h has two parts, to include both free and forced convection. Heat loss due to forced convection is applied to the sides of the part and top of the substrate, as the carrier argon gas flows over these surfaces. Free convection is dominant on the sides and bottom of the substrate, where there is no active gas flow. The heat transfer coefficients are discussed in depth in below.

In steps 708 and 710, for simplicity, we described the heating of only those blocks in the topmost layer. However, in DED the block immediately below the block being heated is also at an elevated temperature as the laser penetrates deeper. The heating of the blocks immediately below an actively heated block is implemented using Goldak's double ellipsoid model, and detailed below.

For each block-by-block iteration of step 3(a) and (b), the temperature of every node is recorded in a vector $T_b$. This is repeated until an entire layer is simulated. After the process reaches the end of the layer, heat is allowed to dissipate by conduction immediately followed by convection in steps of 1 second, iteratively for a period equal to the dwell time ($t_d$). In this work, $t_d$=20 s for Case A, and $t_d$=3 s for Case B and Case C. In Eqns. (5) and (6) the time t=1 s, and therefore the pair of equations are looped together for 20 times for Case A, and 3 times for Cases B and C to simulate the total dwell time between layers.

$$T_{Lc} = \phi e^{-ag\Lambda t_d} \phi' T_b \tag{5}$$

$$T_{Lf} = T_{Lc} e^{-\beta t_d} \tag{6}$$

Steps 706 through 710 are repeated until heating and heat diffusion have been simulated on each layer of nodes (712). For example, steps 706 through 710 are looped until the last layer is built. The temperature of each node at each time step is recorded in a vector T, which contains the thermal history of the part. Then, a representation of the estimated heat distribution within the AM part is output (714). For example, the computing system can generate a three-dimensional heat map of the estimated heat flux within the AM part, e.g., such as those depicted in FIGS. 11A, 11B, and 12.

Implementation

The graph theory approach was implemented for predicting the temperature distribution of the three cases. Calibration was conducted at three different node densities. To arrive at these node densities, the thin wall and substrate were first randomly populated with nodes and then partitioned into discrete blocks, as depicted in FIG. 8. A specified number of nodes were randomly allocated within each block (by the computer code). In this work, the effect of one, two, and three nodes within each block has been studied. Table 4 below provides further details about each of the three node densities.

TABLE 4

Three node densities, and corresponding simulation parameters ε and g.

| Nodes per Block | Total Number of nodes | Node Density (nodes/mm$^3$) | Neighborhood Size, ε (mm) | Gain Factor (g) $T_0 = 1900°$ C. (mm$^{-2}$) | $T_0 = 2200°$ C. (mm$^{-2}$) | $T_0 = 2450°$ C. (mm$^{-2}$) |
|---|---|---|---|---|---|---|
| 1 | 2830 | 0.2355 | 4.5 | 8 | 10 | 12 |
| 2 | 5660 | 0.4709 | 4.75 | 1 | 1.5 | 1.95 |
| 3 | 8490 | 0.7064 | 5.5 | 0.12 | 0.15 | 0.17 |

Case A was used for calibrating the parameters of the graph theory method—namely, the neighborhood size (ε) and gain factor (g) in Eqn. (3). Case A was chosen for calibration given the prominent temperature cycles therein as evidenced in FIG. 4. The neighborhood size is defined as the radius of the imaginary sphere with a particular node at its center; it determines the number of nodes connected to the node in the center of the sphere. Nodes within the volume of the sphere are connected to the node at its center while nodes outside the sphere are not connected to the central node. The gain factor (g) scales the rate of thermal diffusivity or heat flux between nodes. A higher gain factor increases the rate of thermal diffusion through the part (i.e., the larger the gain factor, the faster the heat will dissipate through the part).

An iterative grid search was performed to calibrate the gain factor and neighborhood size. The combination of neighborhood size and gain that resulted in the lowest mean absolute percentage error (MAPE) in Case A was selected and subsequently tested on Cases B and C. This calibration process was repeated for different node densities and melt pool temperatures. In other words, these simulation parameters had to be calibrated only once for a material and node density.

Three other heat transfer coefficients exist in the graph theory approach to the DED simulation; these were estimated in the calibration step and were held constant throughout all ensuing simulation cases, irrespective of node density or melt pool temperature. Table 5 includes the equivalent heat transfer coefficients for the three factors being discussed, along with the corresponding salient thermal phenomena number that describes them in FIG. 3. The first of these factors is referred to as the clamp coefficient. As previously described in the experimental setup, the substrate was clamped at one end. From a heat transfer perspective, the surfaces of the substrate in contact with the clamp had an extra loss since the clamp acts as a heat sink. Therefore, this extra thermal pathway must be considered in the simulation. To account for the extra heat loss without simulating the geometry of the clamp, an elevated loss was considered at the surfaces of the substrate in contact with the clamp. In other words, to approximate the large thermal conduction between the substrate and clamp in the experiment, a relatively large heat transfer coefficient was used on the appropriate surfaces.

TABLE 5

Equivalent heat transfer coefficients used in graph theory method.

| Heat Transfer Coefficient | Inverse Time Constant in Graph-theoretic Method [s$^{-1}$] | Equivalent Heat Transfer Coefficient [W · m$^{-2}$ · K$^{-1}$] | Corresponding Salient Thermal Phenomena Number |
|---|---|---|---|
| Clamp Coefficient | 0.05 | 981.2 | 6 |
| Forced Coefficient | 0.0025 | 49.1 | 3, 4 |
| Free Coefficient | 0.00027 | 5.3 | 5 |

The process uses argon gas to propel titanium powder particles into the laser beam and melt pool. The argon gas continues down the sides of the thin wall while the deposition takes place. Although the sides of the thin wall and top surface of the substrate experience heat loss to a forced flow, the same cannot be assumed for the sides and bottom surface of the substrate. This necessitated a separate consideration of each boundary condition, thus necessitating the use of two distinct heat transfer coefficients. A forced heat loss coefficient was used to describe the forced convection loss caused by the argon shield gas flow originating from the four concentric nozzles. A free coefficient described the remaining free convection loss experienced at the sides and bottom surface of the substrate. These heat losses were divided into two separate components to account for the different flow regimes surrounding the part during the DED process.

Both factors were encapsulated under the broad term heat transfer coefficients, because, apart from conductive and convective heat transfer, heat loss also occurs through radiation. An example calculation using the forced convection inverse time constant is included in Appendix A to demonstrate how equivalent heat transfer coefficients were found.

Sensor Location

A simulated sensor location identical to the location of the thermocouple from the experiment was necessary to validate the graph theory approach. In the graph theory approach, a cloud of nodes is used to approximate the part geometry as in step 1 of FIG. 7, and the location of each node is identified by its Cartesian coordinates. A node closest to the sensor location was identified, and its Cartesian coordinates were modified to match those of the sensor location. Once it was moved to the thermocouple locations shown in FIG. 6, the thermal history of the node was plotted against the experimental data reported by Heigel, et al. This node is henceforth referred to as the sensor node in the context of the graph theory approach.

It is noted that the sensor node location was defined with a slight offset from the actual thermocouple location. This was to account for the fact that the thermocouples in the experiment were covered with aluminum tape to shield them from convection effects. Since the tape was not simulated in the graph-theoretic method, the sensor nodes were "buried" at a depth of 0.1 mm below the surface of the substrate. Since the graph-theoretic method applies convection losses only to exterior surfaces, the sensor node was essentially shielded by no longer being on the surface.

Neighborhood Size

Neighborhood size, described in step 2 of FIG. 7, was determined to be the proper method for this work. However, an alternative quantity that is referred to as "neighborhood number" was also explored. Whereas the neighborhood size defines a sphere of certain radius in which all nodes are connected to the central node, the neighborhood number defines the number of nodes to be connected to a central node, irrespective of spherical radius. For instance, a neighborhood number of ten will include the ten nodes closest to the central node. In a large body with a uniform node density, neighborhood size and number are one and the same, but it was determined that they become vastly different in certain cases.

Neighborhood number was first developed as a means to resolve a nonuniform node density in the graph-theoretic method. This nonuniformity was being explored because the substrate attached to each single-track thin wall was adding a relatively large computational load to the simulation. The obvious solution was then to populate the large substrate volume with fewer nodes since it was simply a large thermal mass acting as a heat sink for the high temperatures induced by the laser. By introducing a lower node density though, fewer substrate nodes fell into any central node's neighborhood size. The result was a substrate that no longer removed heat from the thin wall since very few nodes were connected to the thin wall itself. With the lower nodal density, most substrate nodes were too far away to fall within the specified neighborhood size. Neighborhood number appeared to solve the problem by ensuring that regardless of distance from the central node, a specified number of nodes would still be connected, thus reestablishing the numerous connections throughout the thin wall and substrate.

To fully investigate the neighborhood number and its effects, different location scenarios were introduced. It was quickly realized that sharp edges, and especially corners, became problematic for the neighborhood number. The problem is demonstrated in, where neighborhood number enabled corner nodes to find just as many heat transfer "pathways" as a node in the center of the part. A corner node being able to transfer heat to the same number of neighbors as a central node is not consistent with reality, since the corner node is much more limited by the surface boundaries that surround it. This discovery prompted the author to use neighborhood size instead of neighborhood number to preserve the physics in the real system. Using neighborhood size also meant that a uniform density would have to be maintained throughout the part, including the substrate.

Weight Scaling

Another exploration that was conducted as part of this work involved weight scaling. To understand this concept, recall the network graph that was previously described as one of the major steps used by the graph-theoretic method. The nodes that fill the part are all linked together with an edge. Each edge has an associated weight that is based off of the Gaussian radial basis function, previously shown in Eqn. (1). It was the weight governed by the radial basis function that was being scaled before it went into the network graph.

Similar to the neighborhood number exploration described earlier, this scaling idea arose as a means to resolve the nonuniform node density between the wall and substrate. Due to the nonuniformity in density, the wall was much more efficient at transferring heat than the substrate. Instead of trying to resolve this discrepancy through an adjustment to the neighborhood parameter, like what was attempted and discussed earlier, it was believed that another possibility was to adjust the edge weights between certain nodes. By increasing the edge weights in the substrate, the nodes located therein would become better conductors of heat. This is because in the network graph, the respective edge weights have been adjusted so that the graph-theoretic method treats them as being closer to their partnering nodes than they are. Consequently, the node is able to accept more heat from its partner since it appears to be closer within the neighborhood. By doing this then, the conduction rates through the substrate can be made to duplicate those in the thin wall. This method of scaling the weights in the substrate was found to be effective and yielded promising results. However, the scaling factor that was found to resolve the nonuniformity was not able to be thoroughly corroborated. Consequently, the method was abandoned due to its lack of rigor and substantial evidence.

Transient Material Properties

In all previous works, constant material properties have been assumed by utilizing an average thermal diffusivity term, $\alpha$ ($m^2 \cdot s^{-1}$). In contrast, the current work has defined thermal diffusivity as a function of temperature so that the graph-theoretic method can be further reconciled with reality. To accomplish this, the values in Table 6 were taken from Heigel, et al. and used to calculate corresponding thermal diffusivity values. For all calculated thermal diffusivity values presented in the table, a density of 4,430 kg·m$^{-3}$ was used for Ti-6Al-4V. After a temperature-dependent linear function, shown in Eqn. (7), had been fit to the calculated values, it was used to redefine the thermal diffusivity in the graph-theoretic method. This added capability allowed the graph-theoretic method to approximate a new thermal diffusivity value, $\alpha_{Layer}$, for each layer based on the average temperature that occurred in the layer before it, $T_{Layer}$. Instead of fixing a thermal diffusivity value for the entire simulation, this updated approach requires only an initial value to be defined for the first layer.

TABLE 6

Temperature-dependent thermal properties for Ti-6Al-4V.

| T [° C.] | k [W · m$^{-1}$ · ° C.$^{-1}$] | $C_p$ [J · kg$^{-1}$ · ° C.$^{-1}$] | Calculated $\alpha$ [m$^2$ · s$^{-1}$] |
|---|---|---|---|
| 20 | 6.6 | 565 | 2.64 |
| 93 | 7.3 | 565 | 2.92 |
| 205 | 9.1 | 574 | 3.58 |

TABLE 6-continued

Temperature-dependent thermal properties for Ti-6Al-4V.

| T [° C.] | k [W · m$^{-1}$ · ° C.$^{-1}$] | C$_p$ [J · kg$^{-1}$ · ° C.$^{-1}$] | Calculated α [m$^2$ · s$^{-1}$] |
|---|---|---|---|
| 250 | 9.7 | 586 | 3.74 |
| 315 | 10.6 | 603 | 3.97 |
| 425 | 12.6 | 649 | 4.38 |
| 500 | 13.9 | 682 | 4.60 |

$$\alpha_{Layer} = 0.0042 \times T_{Layer} + 2.612 \quad (7)$$

Goldak's Double Ellipsoid Heat Source Model

Past works applying the graph theory approach to LPBF, assume that the laser elevates the nodes on the surface to the liquidous temperature, e.g., International Patent Application PCT/US2019/051192. In other words, in Eqn. (3), the nodes on the topmost layer have an initial temperature (T$_0$) which subsequently diffuses through the part. Typically, the temperature T$_0$ is set equal to the liquidus temperature of the material being deposited.

Setting the nodes on the topmost layer to the melting point implicitly assumes that the laser does not penetrate past one layer, and that the material at the bottom of that layer is solidified. However, this assumption in the context of the LPBF process does not carry over to DED, and therefore, needed to be relaxed. This is because, as noted previously, the laser velocity in LPBF is 10 to 30 times that of DED (300 mm·s$^{-1}$ versus 10 mm·s$^{-1}$). At the same time, the laser beam has a diameter in the vicinity of 100 µm, while the diameter of the laser beam in DED is closer to 1 millimeter. Consequently, the laser in DED penetrates deep, over multiple layers, into the part. Hence, in DED, not only are the nodes at the surface at an elevated temperature, but so also are nodes in prior layers, immediately below the laser path. Therefore, apart from considering only the surface nodes at a higher temperature, To, it is necessary to initiate the sub-surface nodes with an elevated temperature.

To rigorously quantify the temperature reached by the sub-surface nodes, the heat source effects in DED were captured using the model created by Römer and Huis in't Veld: G. R. B. E. Römer, "Matlab Laser Toolbox User Manual," University of Twente, Enschede, Netherlands Sep. 23, 2010 2010, and G. R. B. E. Römer and A. J. H. i. t. Veld, "Matlab Laser Toolbox," *Physics Procedia*, vol. 5, pp. 413-419, 2010. This model is encapsulated in a Matlab toolbox; the model shown in Eqn. (8) is a slightly revised version of Römer and Huis in't Veld's equation.

$$T(x, y, z, t) = C \times P \times \frac{1}{2\pi K \sqrt{x^2 + y^2 + z^2}} \times \exp\left[-\frac{V}{2\kappa} \times \left(x + \sqrt{x^2 + y^2 + z^2}\right)\right] \quad (8)$$

In Eqn. (8), The laser power, P, and scaling factor, C, are discussed in more detail in the following paragraph. The thermal conductivity is represented by K while the variables x, y, and z are local coordinates. The laser velocity and thermal diffusivity are represented by v and K, respectively. Each variable is defined with appropriate units in Table 7.

TABLE 7

Variable definitions for Equation (8).

| Variable | Units | Value |
|---|---|---|
| C | Dimensionless | 0.125 to 0.191 |
| Laser Power (P) | [W] | 415 |
| Laser Velocity (v) | [m · s$^{-1}$] | 8.5 × 10$^{-3}$ |
| Thermal Conductivity (K) | [W · m$^{-1}$K$^{-1}$] | 6.8 |
| Thermal diffusivity (κ) | [m$^2$ · s$^{-1}$] | 2.7228 × 10$^{-6}$ |

Figure 11A:
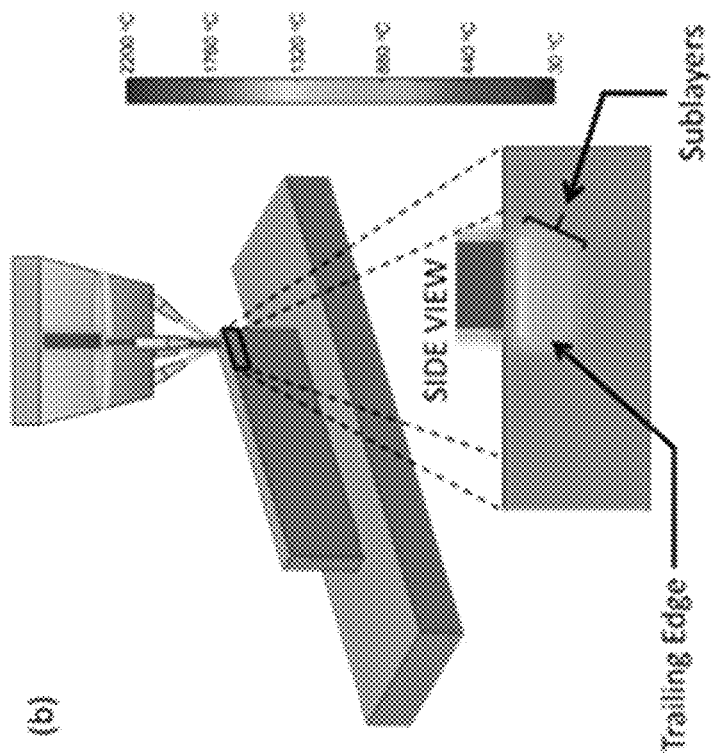
FIGS. 11A and 11B illustrate top and side views of the melt pool.

The equation was revised because the original one presented by Römer and Huis in't Veld was found to have inconsistent units. To reconcile units, the laser power, P, and a unitless scaling factor, C, were included. The reason for the scaling factor becomes evident when considering how the model behaves around the origin, which corresponds to the center of the melt pool. Without the factor, the temperature profile approaches a vertical asymptote at the center of the melt pool. The scaling factor allows the user to essentially place an upper bound on the temperature profile. The upper bound coincides with the liquidus temperature of the material being deposited. In this work, the liquidus temperature was assumed to be 1830° C. for Ti-6Al-4V. Knowing that the laser diameter is 1.5 mm, it was also assumed that the melt pool had an equivalent diameter to that of the laser heating it. Consequently, it was deduced that the liquidus temperature was reached at the periphery of the melt pool, which is depicted in FIG. 11(a). This left the center of the melt pool to conceivably exceed the liquidus temperature by a considerable amount since it remained in the laser beam for a longer duration and was surrounded by molten Ti-6Al-4V. The other three scaling factors defined in Table 7 correspond to different assumed melt pool temperatures.

Figure 10:
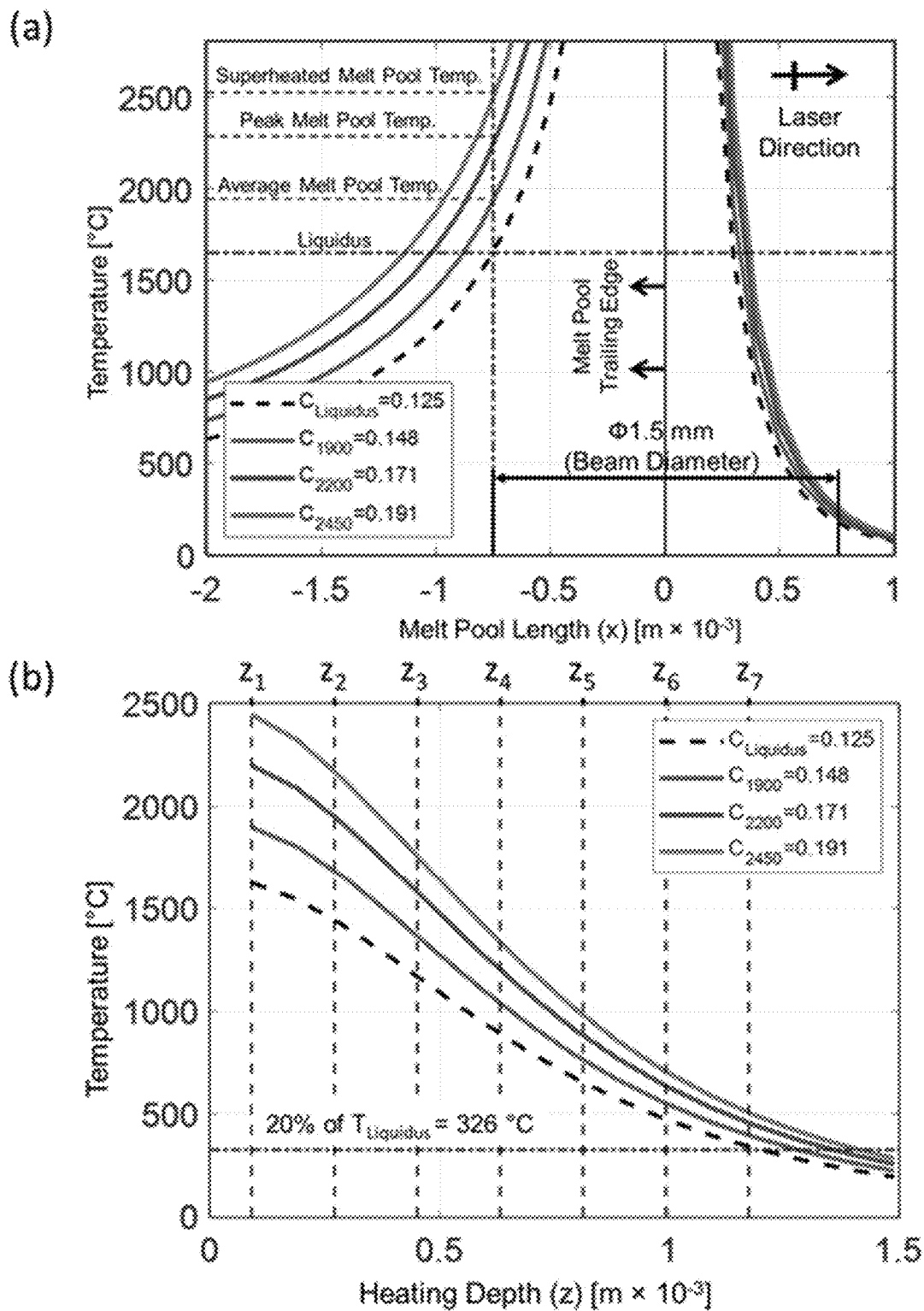
FIG. 10 illustrates the effect of the scaling factor C on the melt pool temperature, as a function of melt pool length and (melt pool depth.

Recall that the purpose of the model is to predict the instantaneous temperature at any position relative to the center of the melt pool. This work leverages that prediction capability to understand the extent to which layers directly below the melt pool, referred to as sublayers, are heated. The temperature profile in FIG. 10 has both a leading and trailing edge since the model assumes a heat source moving with constant velocity, v. It is intuitive then why the trailing edge in FIG. 10 seems to decay slower than the leading edge. Whereas the trailing edge had already experienced the peak temperatures of the melt pool, the leading edge had yet to reach those levels as the laser and accompanying melt pool approached. Therefore, one must choose whether to apply the scaling factor C to the leading edge or trailing edge of the laser. Although a strong case can be made for either, the trailing edge was chosen in this work. The rationale behind that decision is discussed in the next paragraph.

Figure 11B:
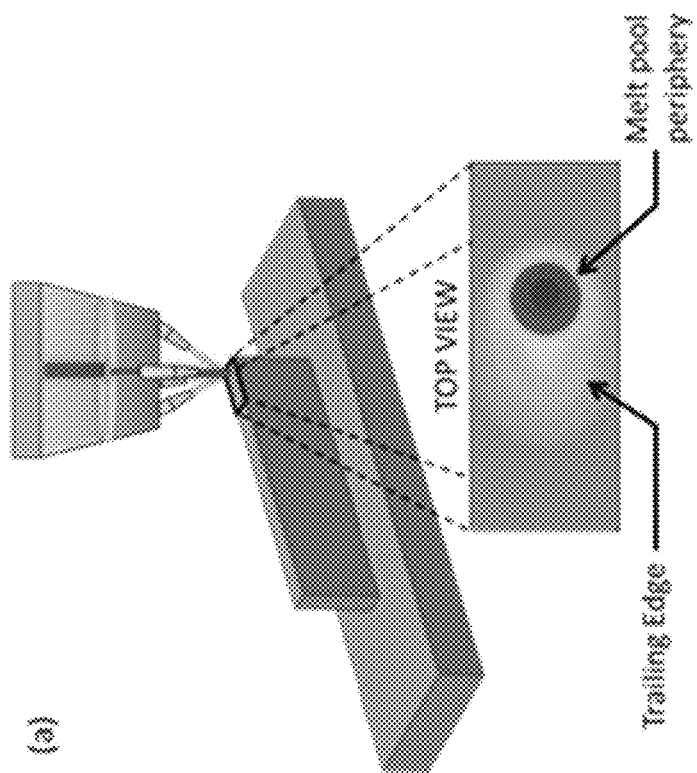

Referring back to FIG. 8 which demonstrates the graph-theoretic method's block-by-block heating scheme, it is evident that the laser heats each block over a discrete time period. Therefore, the laser in the model was not truly continuous. The specified time over which the laser heats a block was calculated based off block length and known velocity of the laser. The resulting heating duration for each block was found to be 0.92 seconds. Since the laser is quasi-stationary as it heats an individual block and those below it, it made the most sense to focus on the trailing edge when applying the scaling factor. After all, that edge corresponds to the portion that just experienced the laser beam's direct radiation. In the graph-theoretic method, the blocks have not just experienced the laser beam's radiation but rather are experiencing it at that moment in time as the heat from the laser penetrates through multiple sublayers, as illustrated in FIG. 11(b).

There are three major steps to obtaining the sublayer temperatures. These steps are described below. One, set a reference point from which all depths will be measured. The reference point in this work was set between the top layer, which receives the most direct radiation from the laser, and the first sublayer. This reference point was chosen because it was assumed that the molten Ti-6Al-4V reaches to at least the bottom of the first layer. If this were not true, it would be impossible for each deposited layer to be fused to the one under it. After the reference point has been set, determine relative depths for each sublayer. To best approximate the temperature in the sublayer blocks, depth measurements were taken at the middle, as opposed to the top or bottom, of each sublayer. Recall that the layer thickness in the experiment was 0.1806 mm. For this reason, the first sublayer temperature was taken at a depth of 0.0903 mm (half of the layer thickness).

Two, adjust the scaling factor C so that the temperature at the periphery of the 1.5-mm (dia.) melt pool matches the liquidus temperature (1830° C.). Save the resulting temperatures for each sublayer corresponding to the depths determined in step 1. Only sublayers with predicted values greater than 20% of the liquidus temperature were included in the graph-theoretic model, since those layers comprise most of the heat from laser penetration.

Three, input the saved temperatures into the model as values normalized to the liquidus temperature.

Critical to the model was the actual melt pool temperature which, as previously mentioned, would conceivably exceed the liquidus temperature. Given the wide range of melt pool temperatures used by other researchers and outlined in Table 2, three different temperatures were tested in a range of approximately 600° C. The lowest of these was approximately 15% higher than the Ti-6Al-4V liquidus temperature at a value of 1900° C. The other two melt pool temperatures considered were 2200° C. and 2450° C. Together, these three temperatures represented an average melt pool temperature, peak melt pool temperature, and superheated melt pool temperature, respectively. Each temperature was simulated increasing the assumed temperature at the melt pool periphery by 15%, 35%, or 50%. The associated temperature profiles are presented in FIG. 10. Ambient temperature of the argon gas in the chamber was assumed to remain at a constant 30° C. throughout each deposition.

Experimental Results

Figure 12:
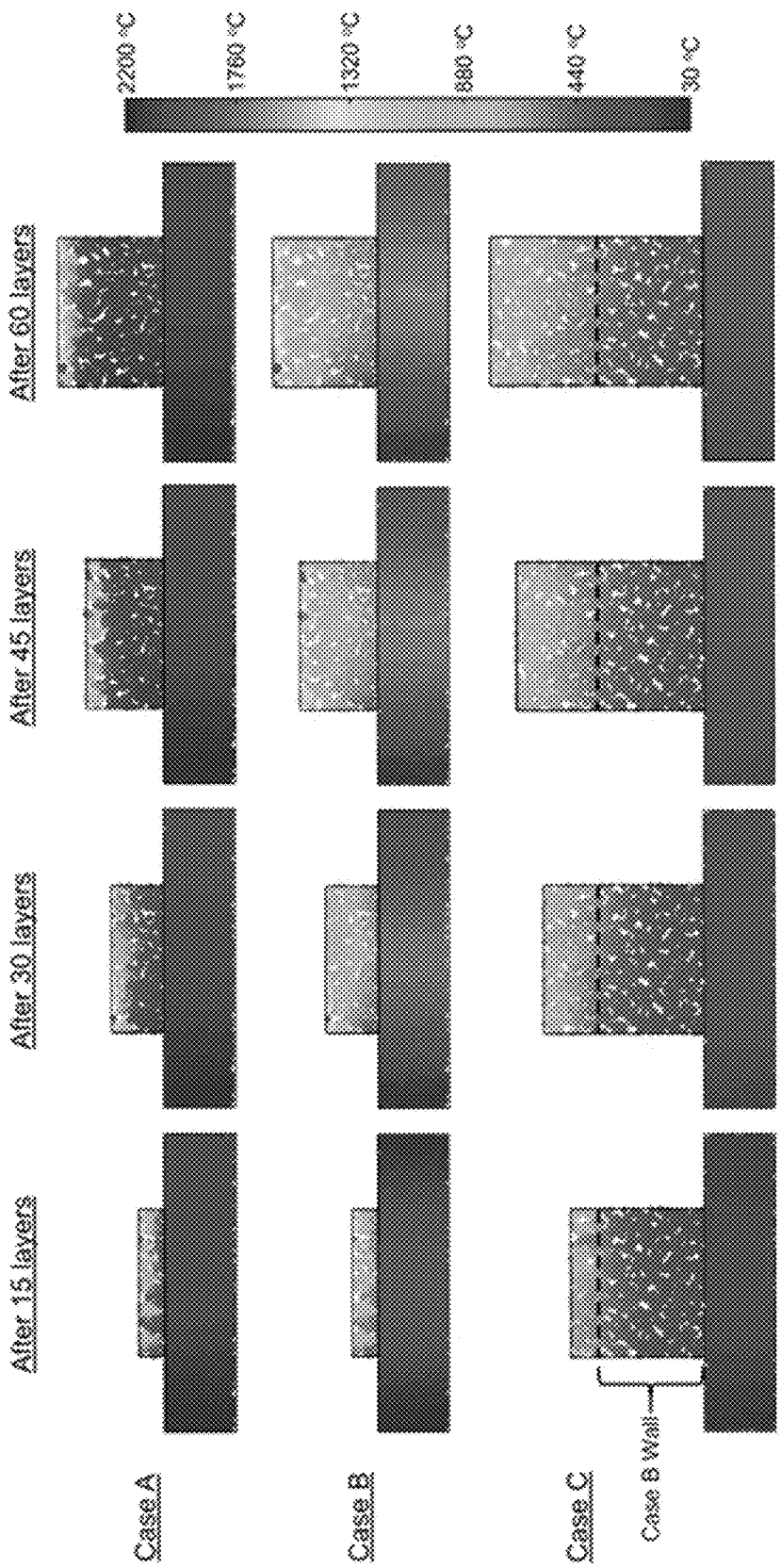
FIG. 12 illustrates snapshots of the graph theory-based simulation for each case. The lack of dwell time in Case B and Case C leads to accumulation of heat in the top layers of the part.

FIG. 12 illustrates the simulation results at four different instances during the deposition process. These results were generated for the peak melt pool temperature (2200° C.). As expected, the highest temperatures were achieved in Case B, where no programmed dwell time was included. In contrast, Case A remained at the lowest temperature, which was due to the 20-second dwell time that was applied between each deposition layer. In the following sections, each case is considered individually, and their results are presented.

Case A Results

Figure 13:
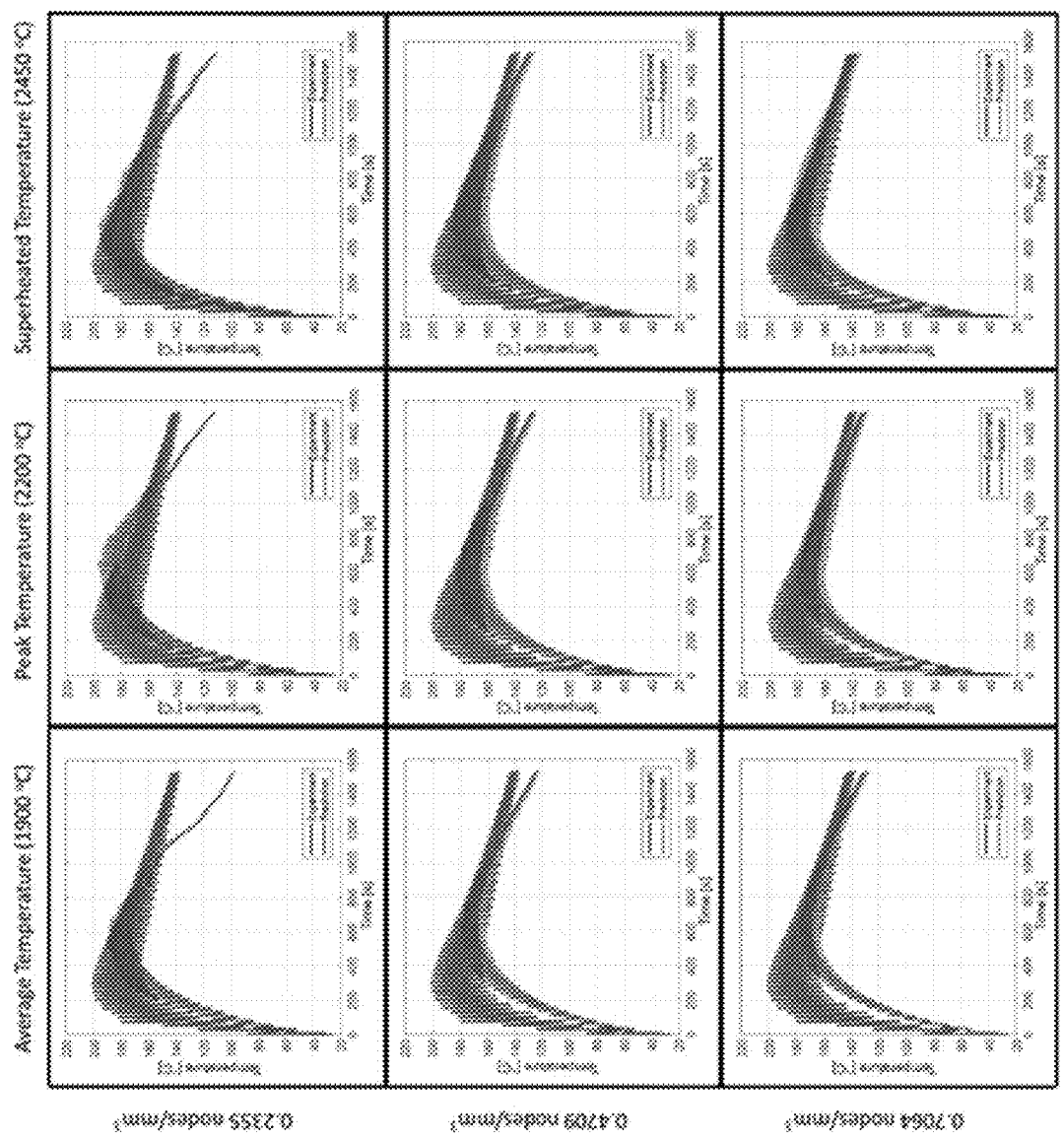
FIG. 13 illustrates simulation results for Case A.

FIG. 13 presents the simulation results and thermal history of the deposition using a 20-second dwell between layers (Case A). In the absence of melt pool temperature data from the experiment, three different melt pool temperatures were considered in the simulation. In addition, recall that three different node densities were also selected. FIG. 13 shows the corresponding results for each melt pool temperature and node density. The calibration values that were determined from Case A (namely, neighborhood size and gain) are presented in Table 4. The neighborhood size is only dependent on node density. It is clear to see that an increased melt pool temperature resulted in larger temperature excursions during the deposition of each layer. This was especially noticeable at the higher node densities, where the prediction results seemed to be stretched vertically as one compared the lowest to highest melt pool temperatures. Due to the programmed 20-second dwell time, Case A resulted in the lowest peak temperature (200° C.) achieved between the three experimental cases.

It may also be noted that the initial rise in temperature observed in the experiment is consistently higher than the graph theory predictions. The main reason for this early-time mismatch is that the gain factor was chosen based off of a calibration of the whole time domain. If the calibration step had only considered the first half of the experimental data, there would have been a smaller mismatch during that portion of the simulation. The portion of experimental data best suited for calibration of the graph-theoretic approach is dependent on the specific situation.

There are two other compounding assumptions in the simulation that could be further contributing to the early-time mismatch: (1) the constant ambient temperature consideration and (2) the laser only melts the material and does not impinge upon the substrate even for the first few layers. Regarding the first assumption, it is assumed that changes in ambient temperature over the course of the build are negligible. In turn, the ambient argon gas that surrounds the thin wall and substrate was fixed at a constant temperature of 30° C. In reality, the envelope of argon that engulfs the part would experience a temperature increase as it reaches a new equilibrium, especially during the initial deposition layers. After transient heating of the gas during those initial layers, a constant ambient temperature assumption would again be more acceptable, but it would likely be higher than the initial temperature of 30° C. If the elevated transient temperature of the gas were to be included in the model, it would lower its ability to remove heat from the thin wall and substrate, leading to a larger initial temperature rise in the prediction. Since the 30° C. temperature assumption was used in all simulation cases, this same explanation can be applied to all graph theory results. In the second assumption, the simulation assumes that the laser only melts the material and does not impinge upon the substrate even for the first few layers. However, this is not the case, as in practice during the first few layers, the laser also strikes the substrate. This inherent laser impingement would tend to preheat the underlying material as new powder enters the laser beam and begins to stick to the substrate or previously deposited layers.

Table 8 shows the corresponding errors and computation times for all Case A simulation results presented in FIG. 13.

The measured build time for Case A was approximately 26 minutes. Errors between the experimental thermal history and graph theory simulation were calculated by comparing the measured temperature to the predicted temperature at instances in time. Two different methods of calculating errors were used in this work. Eqns. (9) and (10) show the mean absolute percentage error (MAPE) and root mean square error (RMSE), respectively:

$$MAPE = \frac{100\%}{n} \times \sum_{i=1}^{n} \left| \frac{T_i - \hat{T}_i}{T_i} \right| \quad (9)$$

$$RMSE = \sqrt{\sum_{i=1}^{n} \frac{(T_i - \hat{T}_i)^2}{n}} \quad (10)$$

where n is the number of instances in time that were compared over the duration of the deposition, i is the current instant of time, $T_i$ is the measured temperature, and $\hat{T}_i$ is the simulated temperature. The lowest MAPE was found to be approximately 6.0%.

TABLE 8

Summary table for Case A simulation.

| Node Density [nodes · mm⁻³] | Computation Time [min] | Data Points (n) | 1900° C. MAPE [%] | 1900° C. RMSE [° C.] | 2200° C. MAPE [%] | 2200° C. RMSE [° C.] | 2500° C. MAPE [%] | 2500° C. RMSE [° C.] |
|---|---|---|---|---|---|---|---|---|
| 0.2355 | 9 | 1800 | 13.10 (1.36) | 25.92 (1.62) | 10.75 (1.95) | 23.21 (2.84) | 10.13 (4.48) | 21.48 (6.88) |
| 0.4709 | 82 | | 9.80 (0.61) | 22.82 (0.99) | 7.65 (1.28) | 18.77 (2.05) | 7.55 (2.34) | 17.67 (3.75) |
| 0.7064 | 194 | | 7.95 (1.62) | 20.70 (1.65) | 6.60 (1.10) | 18.39 (1.41) | 5.98 (2.59) | 16.54 (2.89) |

Case B Results

Figure 14:
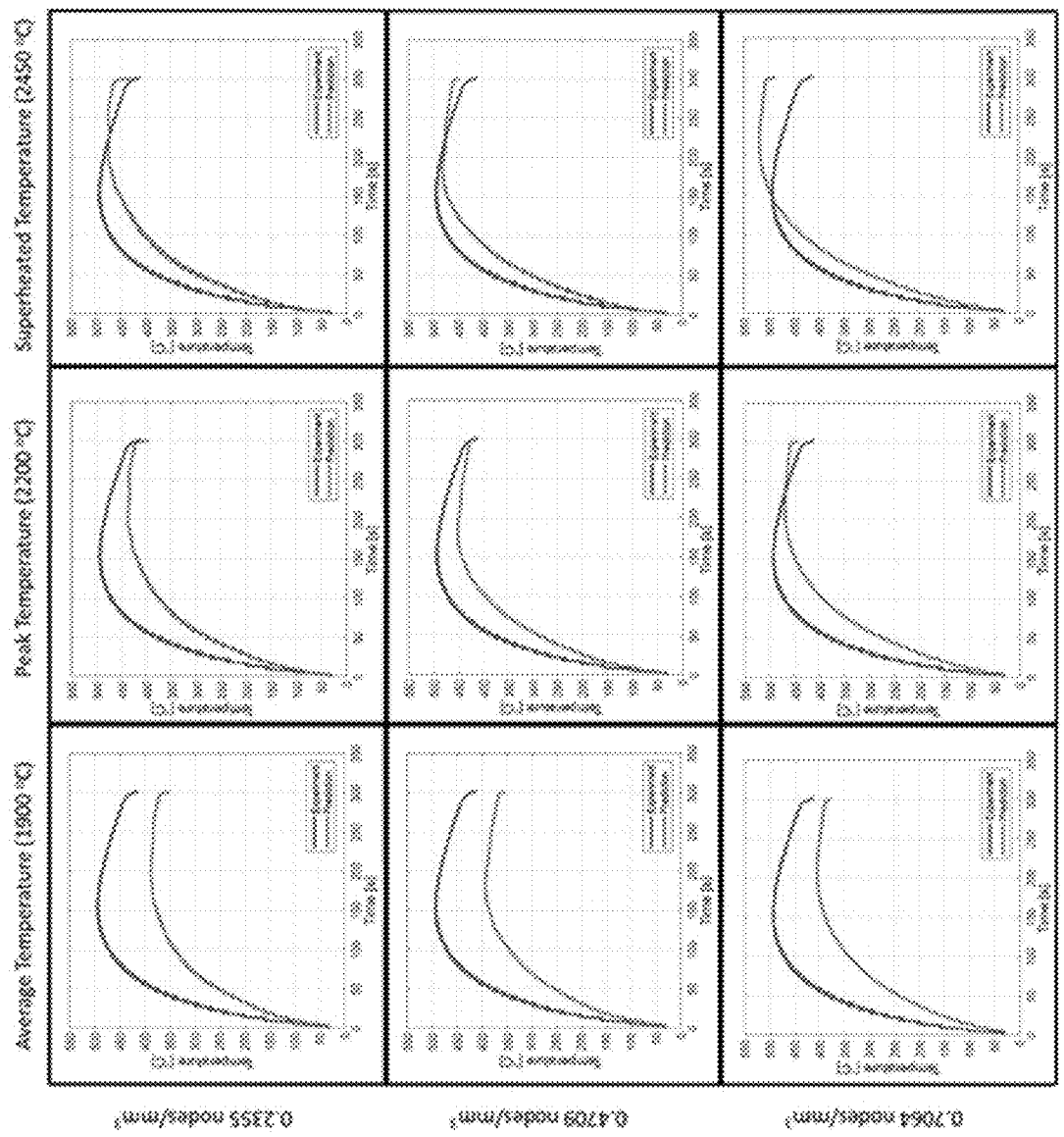
FIG. 14 illustrates simulation results for Case B.

FIG. 14 presents the simulation results and thermal history of the deposition using a 3-second inherent dwell between layers (Case B). Corresponding results for each melt pool temperature and node density are shown. Due to the much lower dwell time, individual temperature excursions for each layer were much less pronounced. In addition, the lower dwell time resulted in a much higher peak temperature of nearly 500° C. in the experiment. The higher temperatures seen throughout the experiment also mean that the constant ambient temperature assumption described previously was less applicable in this case. Once again, it is suspected that this assumption led to a lower temperature rise in the simulation.

Also notable in this case, the graph theory simulation for the superheated melt pool temperature consistently ended with temperatures higher than those of the experiment. This was due to not enough heat being lost to the surroundings as it diffused downwards into the substrate, where the sensor is located. It is suspected that the apparent missing heat loss was likely a result of not directly considering radiation in the graph-theoretic model. As previously discussed, radiative heat loss is not explicitly included in the heat transfer coefficients applied to the part surfaces. However, it is recognized that a component of radiative heat transfer must exist in at least the forced coefficient, the one that is applied to the surfaces of the wall. As the deposition progresses upwards, higher temperatures will be observed in the newly deposited layers. This is because as the wall is built, it forms a longer "bottleneck" through which the heat must be conducted to reach the substrate. Consequently, the heat tends to congregate in the upper region of the thin wall. The growing region of elevated temperatures in the wall allows it to radiate more to the surrounding gas before it can diffuse downwards. This leads to the conclusion that a radiative heat loss term dependent on the wall height existed in the system. In contrast, the radiative heat loss that is currently assumed as part of the forced coefficient had a constant value, irrespective of wall height. A simple example of this phenomenon can be observed by watching a DED system build a thin wall. As the wall height increases, the uppermost regions of the wall tend to glow brighter and longer, indicating that higher temperatures are being reached. This simple observation supports the idea that the heat tends to congregate in the upper portion of the wall. This congregation of heat results in higher radiative heat loss to the surroundings. Without a height-dependent radiative heat loss term in the graph-theoretic model, the elevated temperatures are left to diffuse downwards toward the sensor node, thus making the temperature prediction continue to climb. This hypothesis is supported by the graph theory simulations for Case A, where the much larger dwell time allowed the heat to diffuse downwards instead of congregate in the wall. This mitigated the variation in radiative heat loss over the course of the deposition and as a result, the graph theory simulation temperatures did not exceed those of the experiment at the end of the build.

Table 9 shows the corresponding errors and computation times for all Case B simulation results presented in FIG. 14. The measured build time for Case B was approximately 5 minutes since the dwell time between layers was greatly reduced. Errors between the experimental thermal history and graph theory simulation were found to be larger than those for Case A. This is primarily due to Case A being the case used for calibration of the graph-theoretic model. The same calibrations found for Case A were directly applied to Case B to test the model. The lowest MAPE was found to be approximately 10.5%.

TABLE 9

Summary table for Case B simulation.

| Node Density [nodes · mm⁻³] | Computation Time [min] | Data Points (n) | 1900° C. MAPE [%] | 1900° C. RMSE [° C.] | 2200° C. MAPE [%] | 2200° C. RMSE [° C.] | 2500° C. MAPE [%] | 2500° C. RMSE [° C.] |
|---|---|---|---|---|---|---|---|---|
| 0.2355 | 9 | 900 | 26.54 (2.57) | 114.37 (11.48) | 17.33 (1.61) | 75.04 (5.25) | 10.49 (2.82) | 48.46 (11.63) |
| 0.4709 | 82 | | 24.45 (1.89) | 105.21 (8.23) | 12.70 (0.54) | 59.50 (2.42) | 10.48 (0.90) | 49.46 (3.58) |
| 0.7064 | 194 | | 22.56 (0.47) | 97.95 (1.61) | 12.48 (0.88) | 57.80 (3.76) | 12.38 (0.54) | 53.28 (3.09) |

Case C Results

Figure 15:
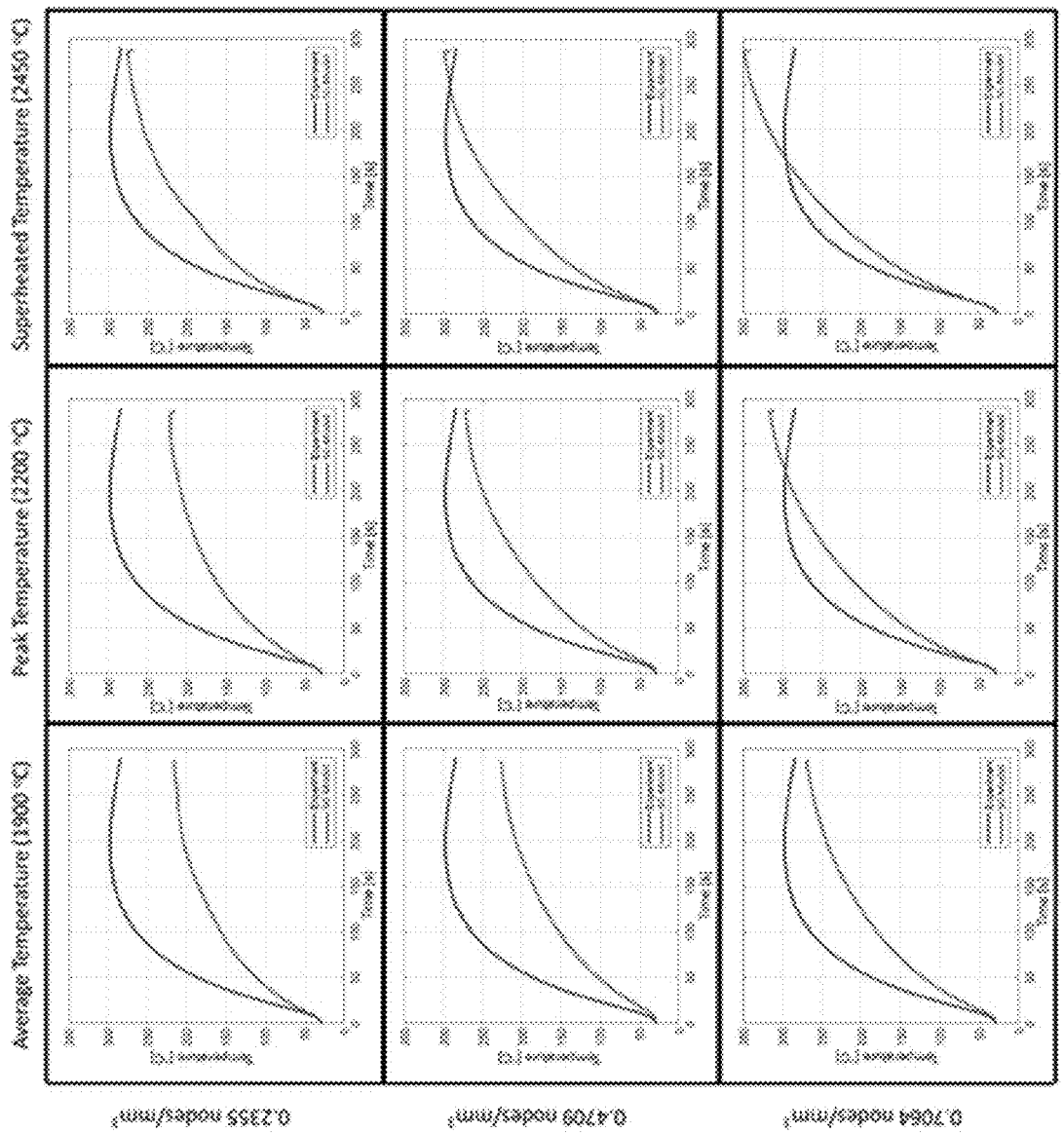
FIG. 15 illustrates simulation results for Case C.

FIG. 15 presents the simulation results and thermal history of the deposition using a 3-second inherent dwell between layers for the double wall (Case C). Recall that this thin wall was built by first depositing the wall for Case B and after it had cooled, depositing another wall on top of it. Corresponding results for each melt pool temperature and node density are shown. As noted in Case B, individual temperature excursions for each layer were less pronounced due to the relatively short 3-second dwell time. Despite this wall being 124 layers tall instead of 62 layers, the lower dwell time still resulted in a peak temperature of nearly 300° C., which is higher than that of Case A. It was observed that the graph theory simulation temperature tended to continue climbing past the experimental temperatures, especially when the melt pool temperature was assumed to be superheated. The same discussion regarding the height-dependent radiative heat loss term applies to this case.

walls. Additionally, it is known that the graph-theoretic model was calibrated for thin walls and substrate that were, in a sense, preheated since the deposition process was never stopped once it had started. In effect, the deposition process for Case C was equivalent to building on a new substrate that had both different thermal properties and a different geometry. It is suspected that these differences in properties and geometry compounded with the constant ambient temperature assumption to give the errors observed in FIG. 15.

Table 10 shows the corresponding errors and computation times for all Case C simulation results presented in FIG. 15. The total build time for Case C was approximately 10 minutes since the dwell time between layers was once again only 3 seconds. Errors between the experimental thermal history and graph theory simulation tended to be the largest of any case, which is largely due to the compounding issues previously described. Case C was the second test case for the calibration values determined from Case A. The lowest MAPE was found to be approximately 9.5%.

TABLE 10

Summary table for Case C simulation.

| Node Density [nodes · mm⁻³] | Computation Time [min] | Data Points (n) | 1900° C. MAPE [%] | 1900° C. RMSE [° C.] | 2200° C. MAPE [%] | 2200° C. RMSE [° C.] | 2500° C. MAPE [%] | 2500° C. RMSE [° C.] |
|---|---|---|---|---|---|---|---|---|
| 0.2355 | 21 | 900 | 31.62 (3.98) | 84.88 (10.69) | 28.19 (2.02) | 78.59 (5.51) | 16.71 (0.49) | 45.72 (1.57) |
| 0.4709 | 188 | | 31.96 (1.06) | 84.02 (2.69) | 19.72 (0.21) | 51.74 (0.90) | 12.51 (1.18) | 35.03 (5.17) |
| 0.7064 | 650 | | 21.84 (1.12) | 55.26 (3.35) | 10.02 (0.69) | 26.05 (3.26) | 9.28 (3.40) | 27.99 (14.63) |

Figure 16:
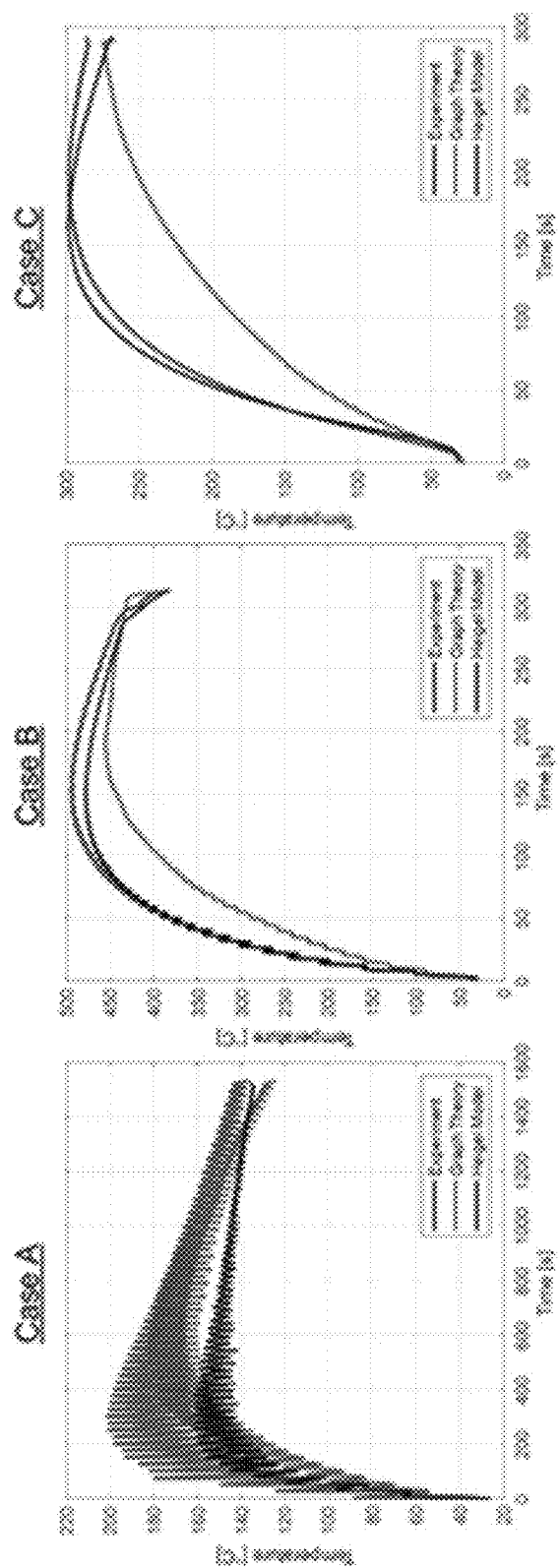
FIG. 16 illustrates case-wise comparison between the experiment, graph-theoretic model, and Heigel, et al. model.

It may also be noted that the rising action of the graph theory simulation was once again not as steep as that of the experiment. One explanation of this is related to the constant ambient temperature discussion, as previously described. Another explanation is related to the geometry of the part. Since the Case C wall was twice as tall as the other walls and the lower half was deposited separately, the heat had twice as far to travel before it reached the sensor node. The previous calibration was not only determined for a wall that was half the height of the current one but also a wall that was at an elevated temperature for the entirety of the build. Since the walls in Cases A and B included layers that had only been deposited seconds or minutes before, they were hot to begin with. From Table 4, it is evident that thermal conductivity increases with temperature. It is suspected that the previously deposited wall composing the lower half of Case C, which was allowed to cool down before continuing, would have different material properties than that of the other The goal of this work was to test the graph-theoretic method on a different, and in many ways more challenging, additive process known as DED. For this to be accomplished, it was necessary to implement new considerations for the salient thermal phenomena that are unique to the process. It was found that by applying the graph-theoretic method to the thin wall deposition experiments, a calculated error of approximately 12% was attainable for each case (A, B, and C). Being the intermediate condition, the peak melt pool temperature case at 2200° C. was considered to be the best case to draw conclusions from. Meanwhile, the average melt pool temperature case attained a calculated error of 22% and the superheated melt pool temperature case typically achieved lower errors of approximately 10% or less for each case. Depending on how much accuracy one desires, an operator could run the simulation in as little as 9 minutes on a standard desktop computer. FIG. 16 shows case-wise comparison between the experiment, graph-theoretic model, and Heigel, et al. model.

TABLE 11

Prediction comparison between Heigel model and the graph-theoretic model for 2200° C. and 0.4709 nodes · mm$^{-3}$.

| Data | Case A Time [min] | Case A MAPE [%] | Case B Time [min] | Case B MAPE [%] | Case C Time [min] | Case C MAPE [%] |
|---|---|---|---|---|---|---|
| Heigel Model | 136 | 10.4 | 136 | 2.4 | No Report | 4.1 |
| Graph Theory | 82 | 7.59 | 82 | 11.94 | 188 | 19.79 |
| Build Time | 25.6 minutes | | 5.2 minutes | | 10.1 minutes | |

This work shows that the graph-theoretic method can provide valid thermal predictions for the DED process at a relatively low computational expense. A qualitative comparison between the graph-theoretic model, Jarred Heigel's model, and the experimental data is presented in FIG. 16. The presented graph-theoretic results correspond with a maximum melt pool temperature of 2200° C. and a node density of 0.4709 nodes mm-3. Table 11 provides a quantitative comparison between both models. It should be noted that the computation time reported for Heigel's model is for the part's half-symmetry. The graph theory computation time, on the other hand, is for the entire part. There are several improvements that can still be made to increase the prediction accuracy of the model. The following list outlines four main improvements for future work.

Obtain melt pool temperature directly from the experiment. Due to inconsistencies in the melt pool temperatures measured by other researchers, three different temperatures were considered. As one can see from the results previously presented, the accuracy of the graph-theoretic method is directly dependent on the melt pool temperature. Therefore, narrowing down the temperature ranges seen at the melt pool level would allow for a better calibration and corresponding prediction.

Resolve disproportionate boundary node quantities. With low node densities in narrow geometries like the one in the thin walls, current boundary node identification techniques begin to classify most of the nodes in the wall as boundary nodes. This is problematic because the extra heat losses associated with convection and radiation are applied to the boundary nodes. If nearly all of the nodes in the wall are being identified as part of the boundary, the entire wall effectively receives an additional heat loss that is only intended for the wall's exterior surfaces. This over application of heat loss can result in an unrealistically low temperature prediction. A subsequent investigation of the boundary node proportions used in this work was conducted and found that nearly 60% of the total number of nodes in the part were identified as boundary nodes for the lowest node density. In contrast, approximately 45% of the total nodes had been identified as existing on the boundaries for the higher node densities. It was then concluded that the lowest node density was experiencing 15% more in heat loss than its higher density counterparts. This disproportionality is most likely manifesting itself by increasing the overall errors.

Implement a more rigorous approximation for radiative heat loss. As previously discussed, radiative heat loss effects are currently assumed to be accounted for as part of the forced coefficient. Considering how much radiative heat loss would vary across part geometries like the thin wall, a more rigorous approach to radiation may be necessary. Even if some radiative heat loss is currently being represented by the forced coefficient, it is evident that the loss would not remain constant over time as the wall height increases with each new deposition layer.

A preliminary exploration into heat loss due to radiation was conducted for the three thin wall cases and is briefly discussed here. The steady-state radiation heat transfer equation is presented in Eqn. (11). In the equation, $\varepsilon$ is the emissivity of the material (assumed to be 0.5 for Ti-6Al-4V), $\sigma$ is the Stefan-Boltzmann onstant, A is the surface area, T is the surface temperature, and $T_\infty$ is the temperature of the surroundings. Since the graph-theoretic approach currently uses convective heat loss at the surface level to approximate other heat transfer mechanisms (i.e., conductive heat loss to the clamp and now radiative heat loss to the surroundings), an equivalent convective heat transfer coefficient must be found to represent radiation. Eqn. (12) shows the resulting equation, which is simply the steady-state convection equation with an added heat transfer coefficient, $h_{rad}$, to approximate heat lost by radiation. In that equation, $h_c$ represents the heat transfer coefficient typically found in the convection equation. The result is an equation for total heat transfer at the surface, which is determined by adding the contributions of both heat transfer mechanisms. The next step was to define the $h_{rad}$ term, which can be found in any heat transfer textbook. The final definition is presented in Eqn. (13).

$$q_{rad} = \varepsilon\sigma A(T^4 - T_\infty^4) \quad (11)$$

$$q = (h_c + h_{rad})A(T - T_\infty) \quad (12)$$

$$h_{rad} = \varepsilon\sigma(T - T_\infty)(T^2 + T_\infty^2) \quad (13)$$

The transient heat loss equation, defined in Appendix A, was then applied to determine the inverse time constant representative of the new radiative heat transfer coefficient, $h_{rad}$. After solving the transient equation for the inverse time constant representing radiation, the inverse time constant was added to its convective loss counterpart that was solved for in Appendix A. As previously stated though, the radiative heat loss term cannot be considered as a constant term, independent of time. As such, it is necessary to find a function that defines the inverse time constant for radiation as a function of temperature. To accomplish this, the average temperature of the top three deposition layers was determined. In other words, after every new layer had been deposited in the simulation, it would calculate the average temperature of the newly deposited layer along with the two layers below it to arrive at one average temperature. That average temperature is what determines the inverse time constant that governs radiative heat loss in the graph-theoretic model, thus giving an approximate radiative heat loss term that increases linearly with each new deposition layer.

Figure 17:
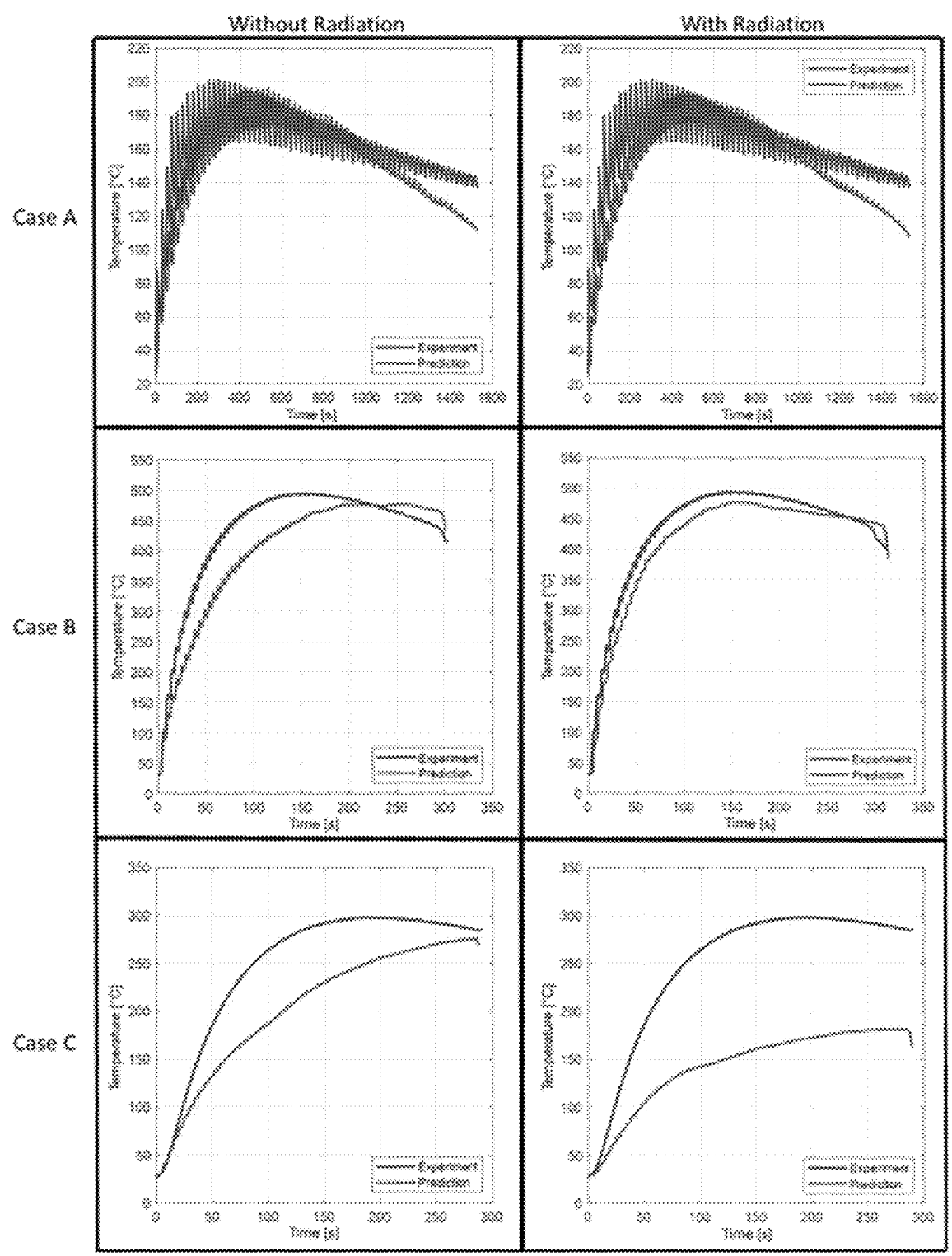
FIG. 17 illustrates case-wise radiation loss effects at melt pool temperature of 2200 C and lowest node density.

The results of the exploration into radiation are presented in FIG. 17. In the interest of time, only the lowest node density was considered with a melt pool temperature of 2200° C. One should note that the added consideration of radiation appears to have had a significant impact on Cases B and C but little to no impact on Case A. This is due to the peak temperatures reached in each case. Since radiation is a temperature-dependent quantity and Case A achieved a lower peak temperature than the other two cases, a lower impact was observed. It is interesting, and not completely understood, why the added radiation appeared to significantly improve the prediction for Case B but had an adverse effect on Case C. This may be related to the new part geometry present in Case C. More work needs to be done to investigate this phenomenon.

Understand implications of the weight scaling method. As previously described, the method was found to be effective and yielded promising results. However, the factor used to scale the weights was not able to be entirely explained since the effects of weight scaling were not exhaustively investigated. Deeper exploration of the theory and application of this method would lead to a better understanding, which may allow it to be employed with more confidence. In turn, a model that can handle heterogeneous node densities would be extremely advantageous for investigating certain user-defined regions of the part. Areas of less interest could accordingly contain a lower number of nodes, thus reducing computation time. The weight scaling method could also lend itself useful to the simulation of a part containing multiple materials. The weights for each new material could be scaled in a way that is representative of each material's thermal properties, thus allowing the changing thermal gradients for different materials to be captured.

Figure 18:
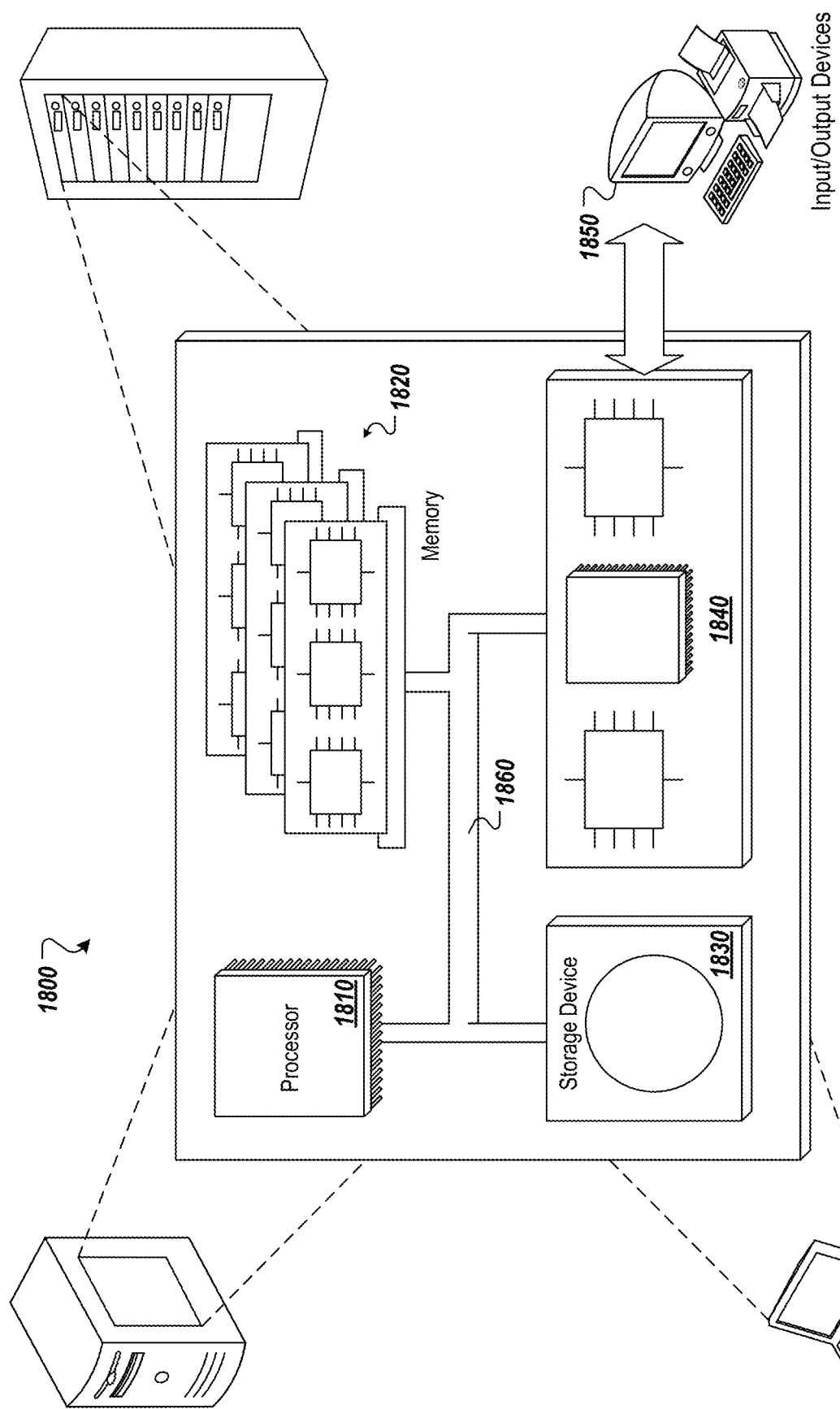
FIG. 18 depicts an example computing system, according to implementations of the present disclosure.

FIG. 18 depicts an example computing system, according to implementations of the present disclosure. The system 1800 may be used for any of the operations described with respect to the various implementations discussed herein. The system 1800 may include one or more processors 1810, a memory 1820, one or more storage devices 1830, and one or more input/output (I/O) devices 1850 controllable via one or more I/O interfaces 1840. The various components 1810, 1820, 1830, 1840, or 1850 may be interconnected via at least one system bus 1860, which may enable the transfer of data between the various modules and components of the system 1800.

The processor(s) 1810 may be configured to process instructions for execution within the system 1800. The processor(s) 1810 may include single-threaded processor(s), multi-threaded processor(s), or both. The processor(s) 1810 may be configured to process instructions stored in the memory 1820 or on the storage device(s) 1830. For example, the processor(s) 1810 may execute instructions for the various software module(s) described herein. The processor(s) 1810 may include hardware-based processor(s) each including one or more cores. The processor(s) 1810 may include general purpose processor(s), special purpose processor(s), or both.

The memory 1820 may store information within the system 1800. In some implementations, the memory 1820 includes one or more computer-readable media. The memory 1820 may include any number of volatile memory units, any number of non-volatile memory units, or both volatile and non-volatile memory units. The memory 1820 may include read-only memory, random access memory, or both. In some examples, the memory 1820 may be employed as active or physical memory by one or more executing software modules.

The storage device(s) 1830 may be configured to provide (e.g., persistent) mass storage for the system 1800. In some implementations, the storage device(s) 1830 may include one or more computer-readable media. For example, the storage device(s) 1830 may include a floppy disk device, a hard disk device, an optical disk device, or a tape device. The storage device(s) 1830 may include read-only memory, random access memory, or both. The storage device(s) 1830 may include one or more of an internal hard drive, an external hard drive, or a removable drive.

One or both of the memory 1820 or the storage device(s) 1830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1800. In some implementations, the CRSM may include a data store that provides storage of computer-readable instructions or other information in a non-transitory format. The CRSM may be incorporated into the system 1800 or may be external with respect to the system 1800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1810 and the memory 1820 may be supplemented by, or incorporated into, one or more application-specific integrated circuits (ASICs).

The system 1800 may include one or more I/O devices 1850. The I/O device(s) 1850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1850 may also include one or more output devices such as a display, LED(s), an audio output device (e.g., a speaker), a printer, a haptic output device, and so forth. The I/O device(s) 1850 may be physically incorporated in one or more computing devices of the system 1800, or may be external with respect to one or more computing devices of the system 1800.

The system 1800 may include one or more I/O interfaces 1840 to enable components or modules of the system 1800 to control, interface with, or otherwise communicate with the I/O device(s) 1850. The I/O interface(s) 1840 may enable information to be transferred in or out of the system 1800, or between components of the system 1800, through serial communication, parallel communication, or other types of communication. For example, the I/O interface(s) 1840 may comply with a version of the RS-232 standard for serial ports, or with a version of the IEEE 1284 standard for parallel ports. As another example, the I/O interface(s) 1840 may be configured to provide a connection over Universal Serial Bus (USB) or Ethernet. In some examples, the I/O interface(s) 1840 may be configured to provide a serial connection that is compliant with a version of the IEEE 1394 standard.

The I/O interface(s) 1840 may also include one or more network interfaces that enable communications between computing devices in the system 1800, or between the system 1800 and other network-connected computing systems. The network interface(s) may include one or more network interface controllers (NICs) or other types of transceiver devices configured to send and receive communications over one or more communication networks using any network protocol.

Computing devices of the system 1800 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

APPENDIX A. HEAT TRANSFER COEFFICIENT CALCULATION

Transient Heat Loss: $\exp\left(-\frac{h \times A \times t}{\rho \times V \times c}\right) = e^{-\beta \times t}$ Solve for heat transfer coefficient: $h = \left(\frac{\beta \times \rho \times V \times c}{A}\right)$ Simplify: $h = (\beta \times \rho \times L \times c)$

| Variable | Value | Units |
|---|---|---|
| Heat Transfer Coefficient, h | 49.1 | $W \cdot m^{-2} \cdot K^{-1}$ |
| Inverse Time Constant, $\beta$ | 0.0025 | $s^{-1}$ |
| Material Density, $\rho$ | 4430 | $kg \cdot m^{-3}$ |
| Block Length, L | 0.00784 | m |
| Specific Heat, c | 565 | $J \cdot kg^{-1} \cdot K^{-1}$ |

What is claimed is:

1. An additive manufacturing heat transfer simulation method executed by at least one processor, the method comprising:
    converting a model of an object into a node representation of the object;
    generating a network graph of the object based on the node representation;
    for each block of nodes in the node representation:
        applying a simulated heat to the block of nodes,
        estimating a diffusion of heat to other nodes based on the network graph, and
        estimating a heat loss to atmosphere; and
    generating, based on estimating the diffusion of heat to other nodes based on the network graph and estimating the heat loss to the atmosphere, a representation of an estimated heat distribution within the object.

2. The method of claim 1, wherein generating the network graph of the object based on the node representation comprises:
    defining layers of nodes by sorting nodes of the node representation based on respective z-coordinates of the nodes;
    defining hatches of nodes by sorting the nodes of the node representation based on respective y-coordinates of the nodes;
    defining blocks of nodes by sorting the nodes in each hatch and layer into discrete blocks; and
    building the network graph based on relationships between the nodes.

3. The method of claim 1, wherein the representation of the estimated heat distribution within the object comprises a representation of heat flux within the object.

4. The method of claim 1, wherein the representation of the estimated heat distribution within the object comprises a representation of temperature distribution within the object.

5. The method of claim 2, wherein a size for each block of nodes is based on a nozzle velocity of a DED nozzle and a predetermined time step size.

6. The method of claim 1, wherein estimating the heat loss to the atmosphere comprises estimating heat loss through forced and free convection from the nodes on the surface of the object.

7. The method of claim 1, wherein estimating the diffusion of heat to other nodes based on the network graph comprises estimating an amount of heat passed through conduction to nodes within layers and blocks that have previously been simulated as being deposited.

8. An additive manufacturing heat transfer simulation system comprising:
    at least one processor; and a data store coupled to the at least one processor having instructions stored thereon which, when executed by the at least one processor, causes the at least one processor to perform operations comprising:
        converting a model of an object into a node representation of the object;
        generating a network graph of the object based on the node representation;
        for each block of nodes in the node representation:
            applying a simulated heat to the block of nodes,
            estimating a diffusion of heat to other nodes based on the network graph, and
            estimating a heat loss to atmosphere; and
        generating, based on estimating the diffusion of heat to other nodes based on the network graph and estimating the heat loss to the atmosphere, a representation of an estimated heat distribution within the object.

9. The system of claim 8, wherein generating the network graph of the object based on the node representation comprises:
defining layers of nodes by sorting nodes of the node representation based on respective z-coordinates of the nodes;
defining hatches of nodes by sorting the nodes of the node representation based on respective y-coordinates of the nodes;
defining blocks of nodes by sorting the nodes in each hatch and layer into discrete blocks; and
building the network graph based on relationships between the nodes.

10. The system of claim 8, wherein the representation of the estimated heat distribution within the object comprises a representation of heat flux within the object.

11. The system of claim 8, wherein the representation of the estimated heat distribution within the object comprises a representation of temperature distribution within the object.

12. The system of claim 9, wherein a size for each block of nodes is based on a nozzle velocity of a DED nozzle and a predetermined time step size.

13. The system of claim 8, wherein estimating the heat loss to the atmosphere comprises estimating heat loss through forced and free convection from the nodes on the surface of the object.

14. The system of claim 8, wherein estimating the diffusion of heat to other nodes based on the network graph comprises estimating an amount of heat passed through conduction to nodes within layers and blocks that have previously been simulated as being deposited.

15. A non-transitory computer readable storage medium storing instructions that, when executed by at least one processor, cause the at least one processor to perform operations comprising:
converting a model of an object into a node representation of the object;
generating a network graph of the object based on the node representation;
for each block of nodes in the node representation:
applying a simulated heat to the block of nodes,
estimating a diffusion of heat to other nodes based on the network graph, and
estimating a heat loss to atmosphere; and
generating, based on estimating the diffusion of heat to other nodes based on the network graph and estimating the heat loss to the atmosphere, a representation of an estimated heat distribution within the object.

16. The medium of claim 15, wherein the representation of the estimated heat distribution within the object comprises a representation of heat flux within the object.

17. The method of claim 1, comprising:
generating, based on the representation of the estimated heat distribution within the object, process parameters for use in additive manufacturing of the object.

18. The method of claim 17, comprising:
performing additive manufacturing of the object using the process parameters generated based on the representation of the estimated heat distribution within the object.

19. The method of claim 1, wherein converting the model of the object into the node representation of the object comprises:
converting the model of the object into a node representation with a uniform node density.

20. The method of claim 1, wherein converting the model of the object into the node representation of the object comprises:
converting the model of the object into a node representation with heterogeneous node densities.

* * * * *